(12) United States Patent
Miyano

(10) Patent No.: US 8,520,312 B2
(45) Date of Patent: Aug. 27, 2013

(54) FINDER APPARATUS AND IMAGING APPARATUS

(75) Inventor: Hitoshi Miyano, Saitama (JP)

(73) Assignee: Fujifilm Corporation, Tokyo (JP)

( * ) Notice: Subject to any disclaimer, the term of this patent is extended or adjusted under 35 U.S.C. 154(b) by 185 days.

(21) Appl. No.: 13/210,056

(22) Filed: Aug. 15, 2011

(65) Prior Publication Data

US 2012/0038991 A1    Feb. 16, 2012

(30) Foreign Application Priority Data

Aug. 16, 2010    (JP) ................................. 2010-181787

(51) Int. Cl.
    *G02B 25/00*    (2006.01)
(52) U.S. Cl.
    USPC ........................................................ 359/643
(58) Field of Classification Search
    USPC ......... 359/642–643, 722, 724, 744; 396/152, 396/382
    See application file for complete search history.

(56) References Cited

U.S. PATENT DOCUMENTS

2001/0028500 A1* 10/2001 Koyama ....................... 359/431

FOREIGN PATENT DOCUMENTS

| JP | 7-218987   | 8/1995  |
|----|------------|---------|
| JP | 3026233    | 1/2000  |
| JP | 2000-352740| 12/2000 |
| JP | 2001-013549| 1/2001  |

* cited by examiner

*Primary Examiner* — James Greece
(74) *Attorney, Agent, or Firm* — Young & Thompson

(57) ABSTRACT

A finder apparatus superimposes, on an image formed by an observation optical system of a reverse-Galilean finder including an objective lens group and an eyepiece lens group, display on a display member arranged outside an optical path of the observation optical system by using an optical path combination member arranged between the objective lens group and the eyepiece lens group, thereby making a user observe the image on which the display is superimposed. The finder apparatus includes a target lens group that guides light from the display member, and which is provided in an optical path from the display member to the eyepiece lens group. Further, the focal length of the eyepiece lens group, and a combined focal length from the target lens group through the eyepiece lens group satisfy predetermined formulas.

8 Claims, 17 Drawing Sheets

EXAMPLE 1-1 (OBSERVATION OPTICAL SYSTEM)

EXAMPLE 1-1 (DISPLAY OPTICAL SYSTEM)

EXAMPLE 1-2 (DISPLAY OPTICAL SYSTEM)

EXAMPLE 2-1 (DISPLAY OPTICAL SYSTEM)

EXAMPLE 2-2 (DISPLAY OPTICAL SYSTEM)

EXAMPLE 2-3 (OBSERVATION OPTICAL SYSTEM)

EXAMPLE 2-3 (DISPLAY OPTICAL SYSTEM)

EXAMPLE 2-4 (OBSERVATION OPTICAL SYSTEM)

EXAMPLE 2-4 (DISPLAY OPTICAL SYSTEM)

EXAMPLE 2-5 (OBSERVATION OPTICAL SYSTEM)

EXAMPLE 2-5 (DISPLAY OPTICAL SYSTEM)

FIG.16 EXAMPLE 3-1
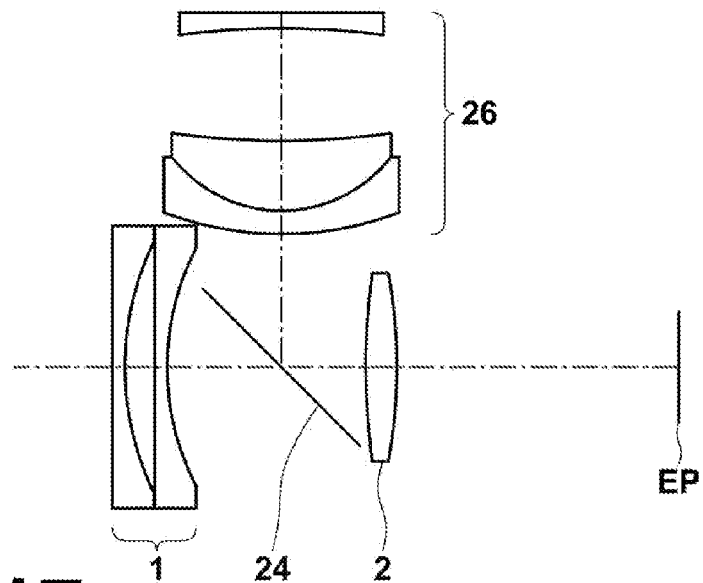
FIG.17 EXAMPLE 3-1 (OBSERVATION OPTICAL SYSTEM)
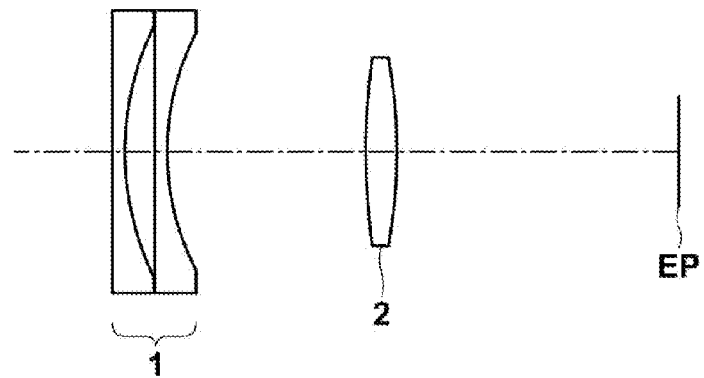
FIG.18 EXAMPLE 3-1 (DISPLAY OPTICAL SYSTEM)
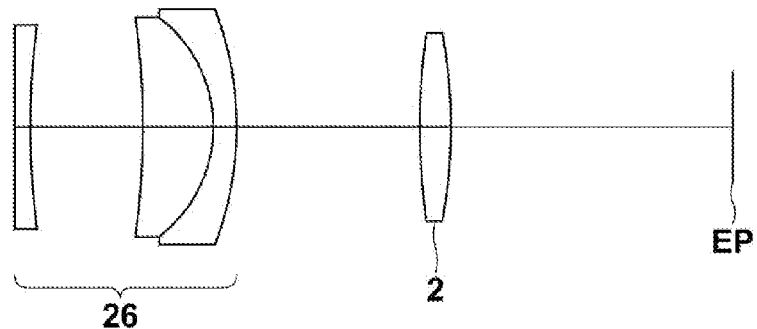

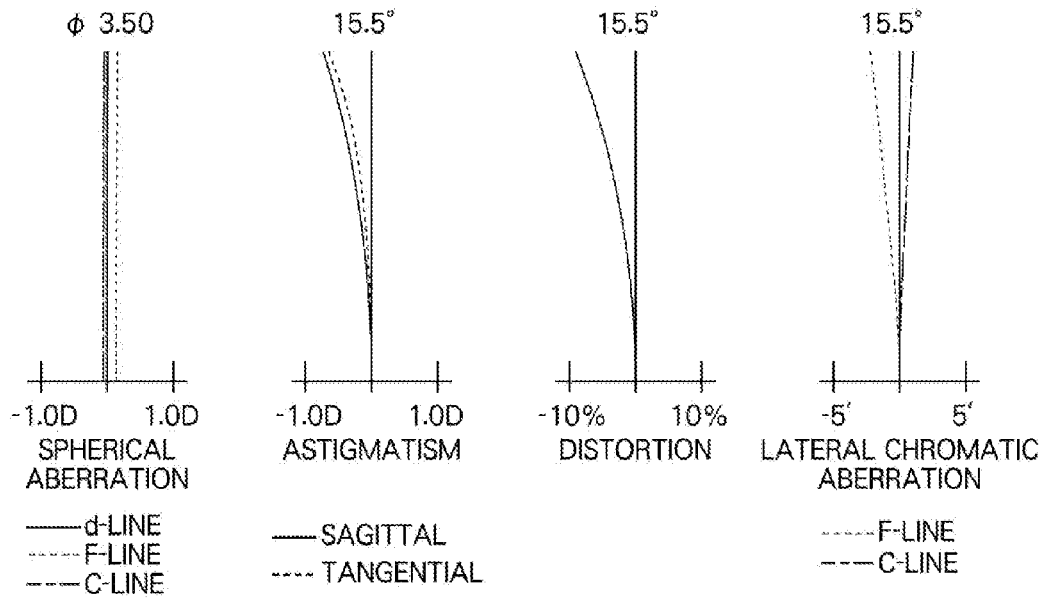
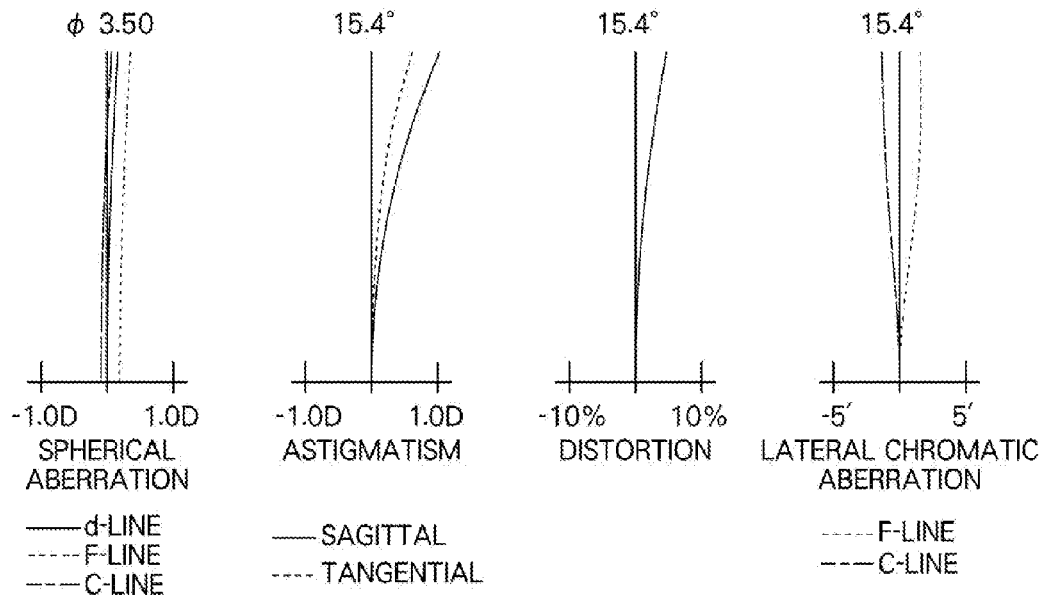

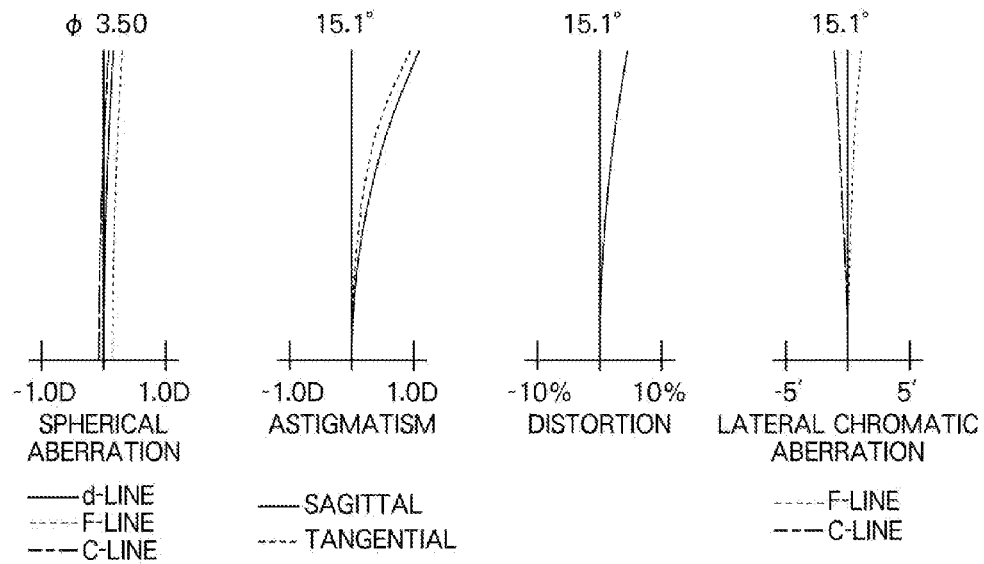
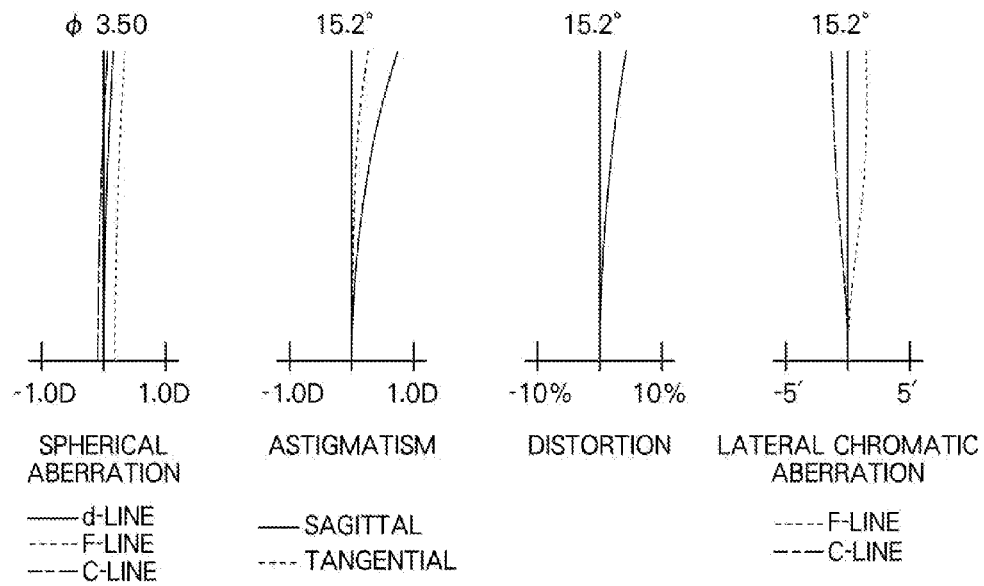

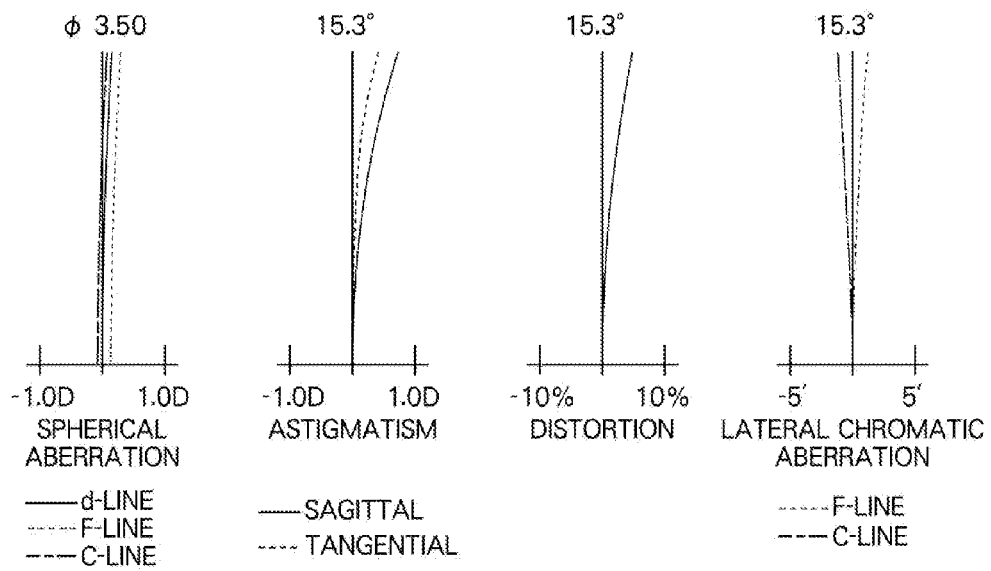
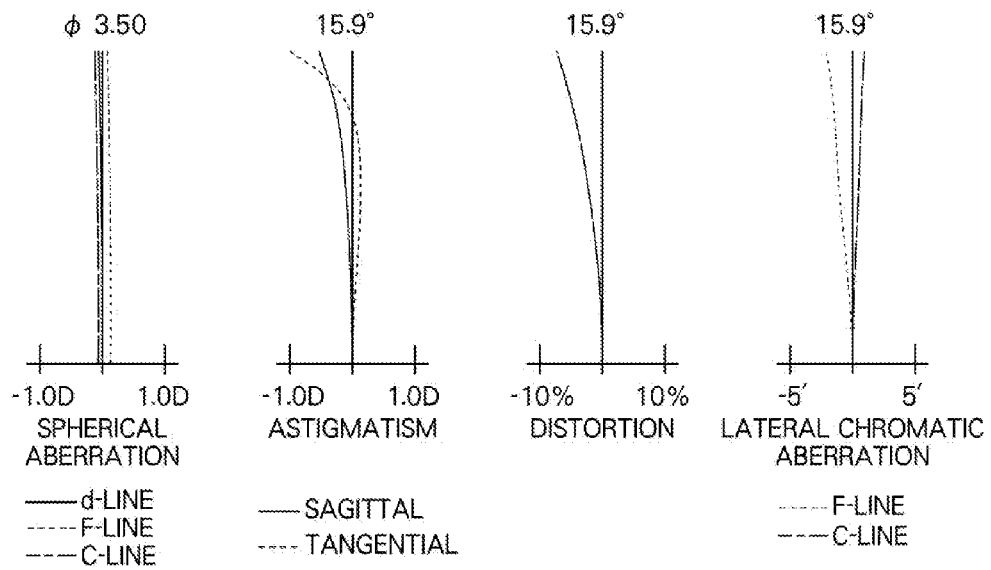

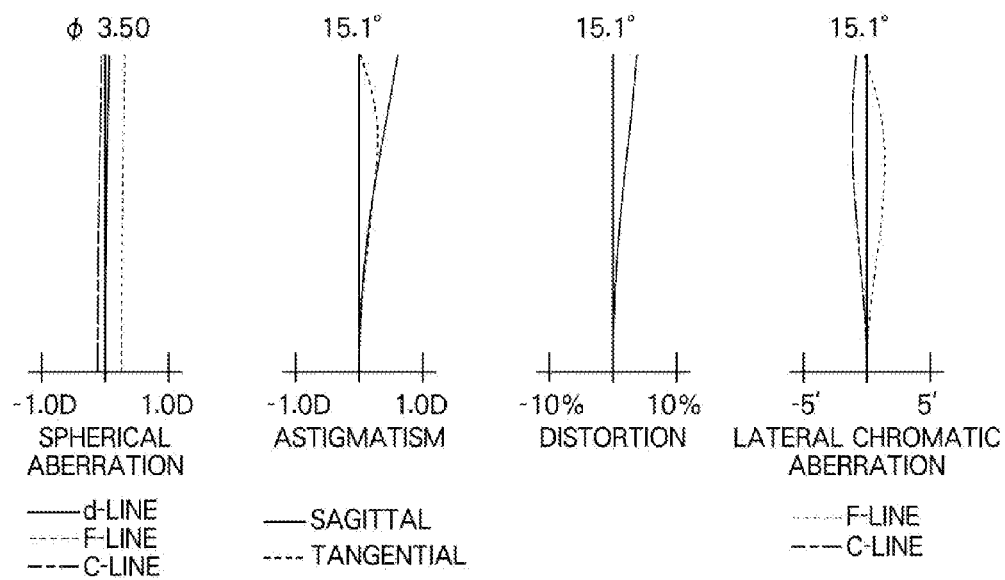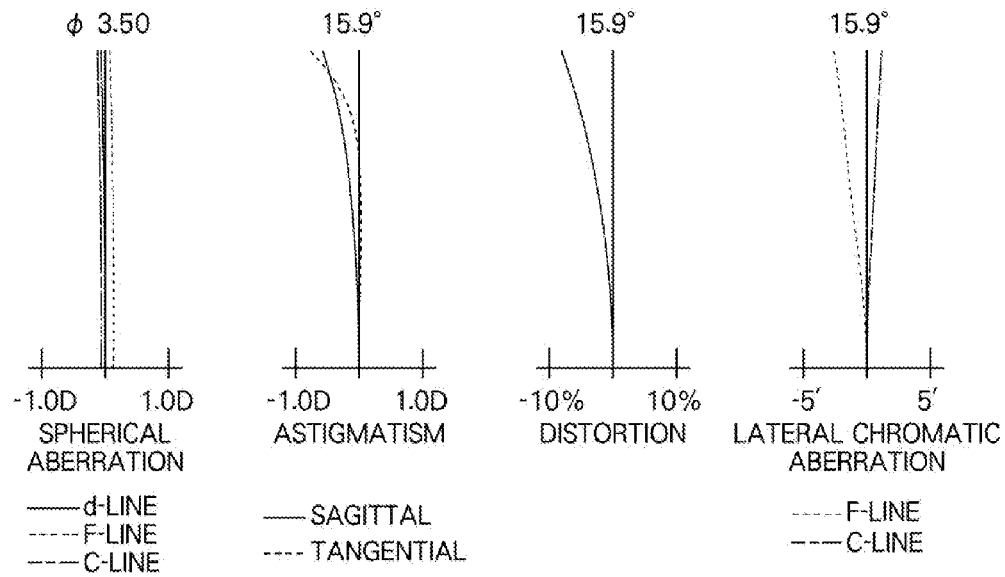

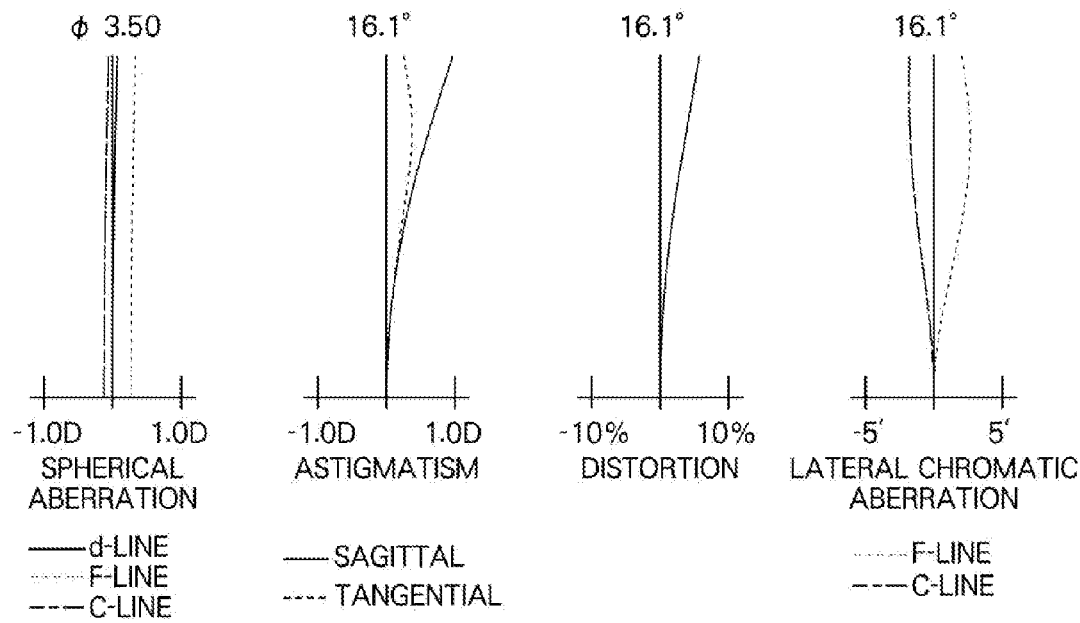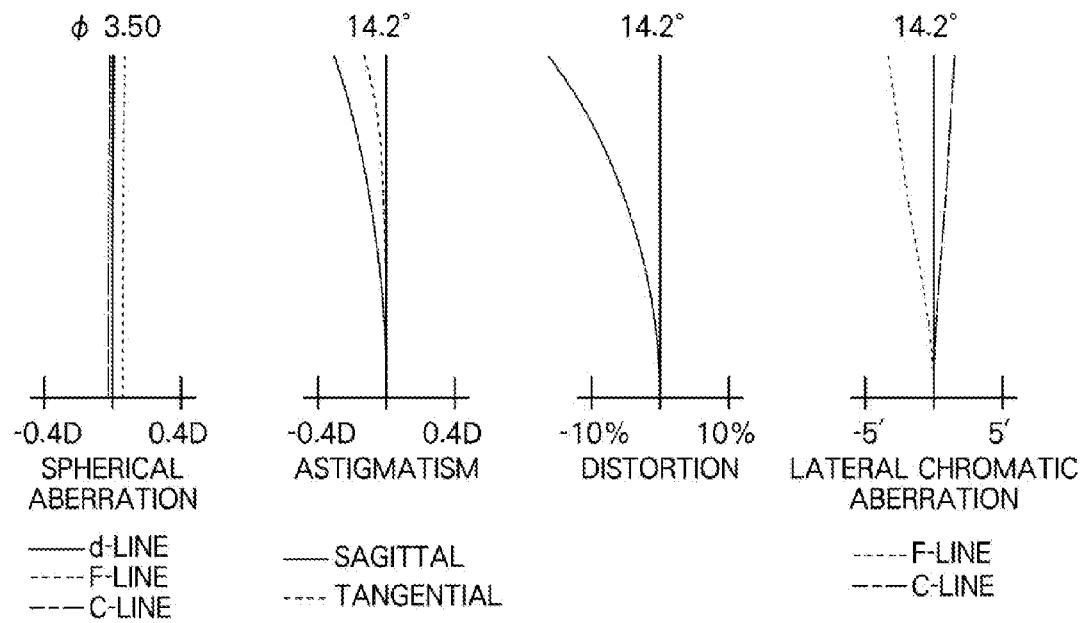

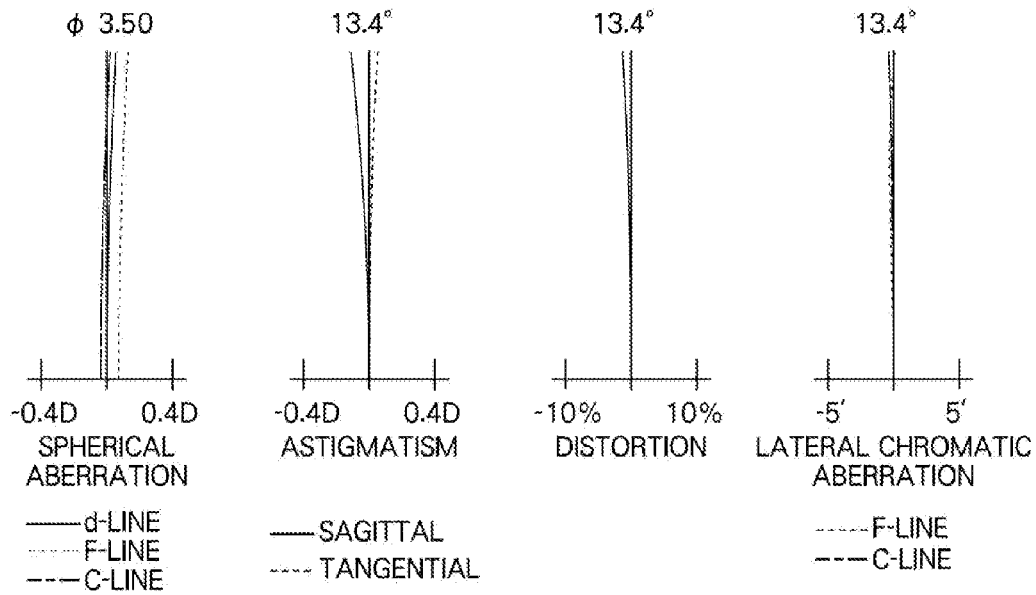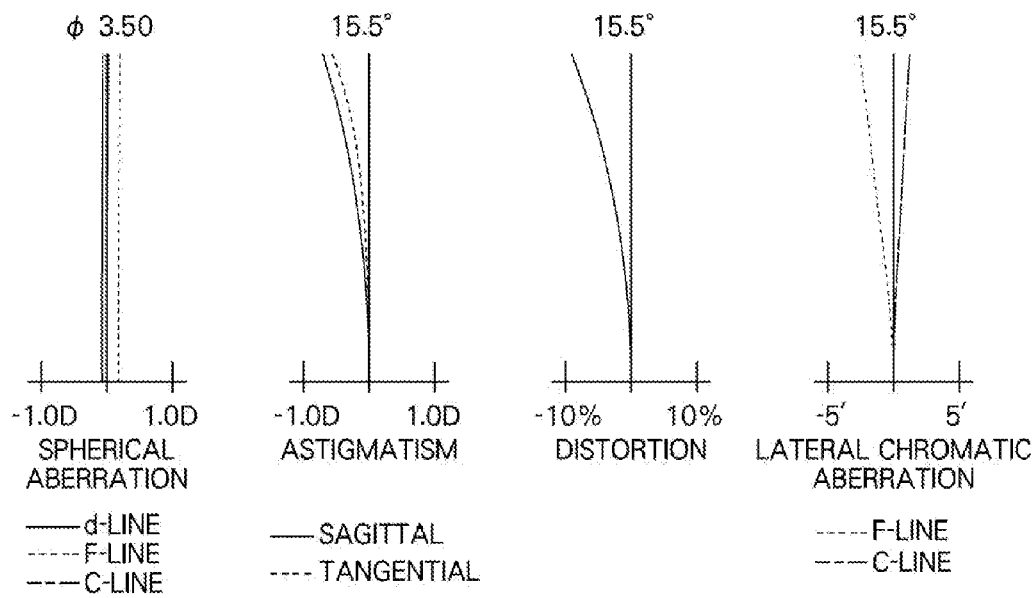

EXAMPLE 3-1 (DISPLAY OPTICAL SYSTEM)

COMPARATIVE EXAMPLE 1 (OBSERVATION OPTICAL SYSTEM)

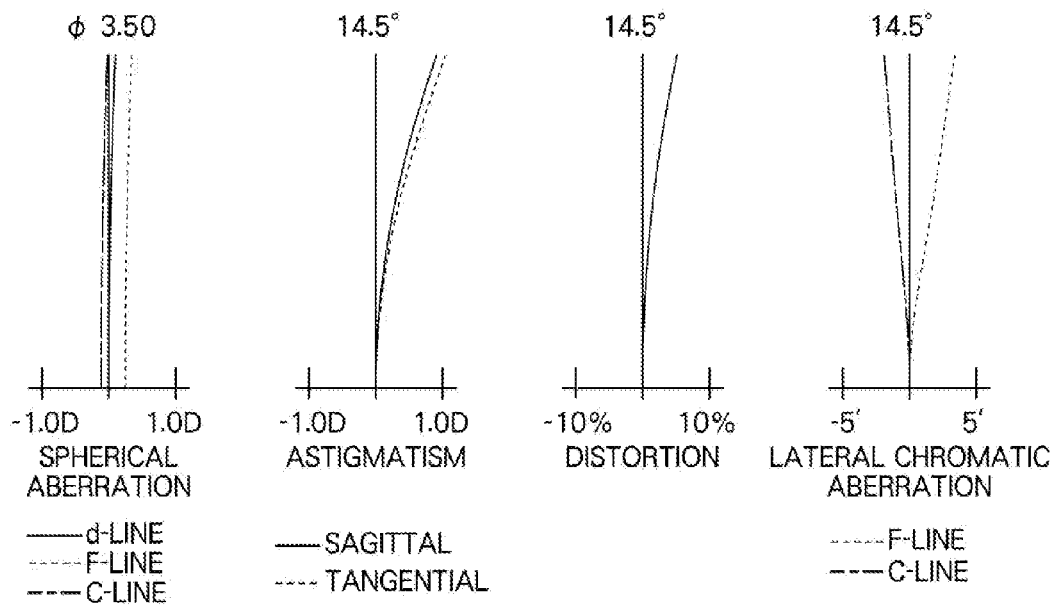
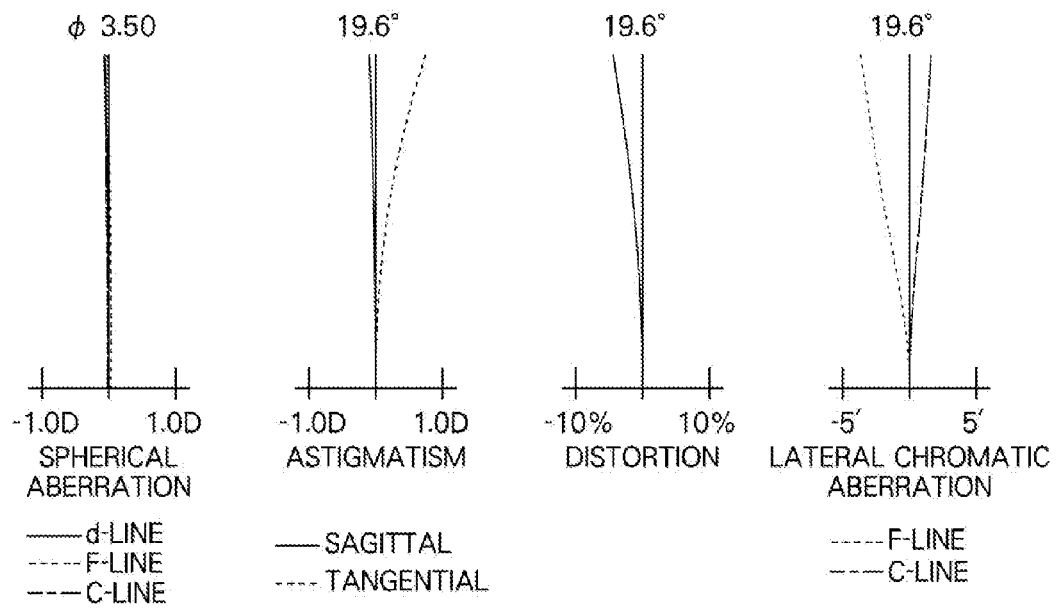

FINDER APPARATUS AND IMAGING APPARATUS

BACKGROUND OF THE INVENTION

1. Field of the Invention

The present invention relates to a finder apparatus and an imaging apparatus. In particular, the present invention relates to a finder apparatus that superimposes, on an image formed by an observation optical system of a reverse-Galilean finder, display of a field-of-view frame or the like for example to make a user visually recognize the image on which such display is superimposed. Further, the present invention relates to an imaging apparatus in which the finder apparatus is mounted.

2. Description of the Related Art

Conventionally, reverse-Galilean finders were used in finder apparatuses of cameras or the like (please refer to Japanese Unexamined Patent Publication No. 2000-352740 (Patent Document 1), Japanese Unexamined Patent Publication No. 2001-013549 (Patent Document 2), Japanese Unexamined Patent Publication No. 7(1995)-218987 (Patent Document 3), and Japanese Patent No. 3026233 (Patent Document 4)). The reverse-Galilean finder is composed of an objective lens having negative refractive power and an eyepiece lens having positive refractive power. In some finder apparatuses, information such as a field-of-view frame is displayed by using a display member, and a reflective member such as a half mirror is provided in an optical path of the observation optical system to make a user observe an image in which the information such as the field-of-view frame is superimposed on a subject image formed by the observation optical system. Among such finder apparatuses, a finder apparatus that illuminates information, such as a field-of-view frame, by using external light is called as an illuminating-window-type finder.

In many finder apparatuses that superimpose information about a field-of-view frame or the like on an image formed by an observation optical system to make a user observe such an image, an optical system for guiding images to the observer's eye, which is called as a target lens, is provided between a display member and an eyepiece lens. The target lens is provided to make the information, such as the field-of-view frame, and the diopter scale of a subject image become appropriate for the observer's eye, and to make the field of view in actual observation coincide with a range in which the field-of-view frame is displayed.

In the illuminating-window-type finder, information such as a field-of-view frame is illuminated by external light. Therefore, when the illumination intensity of the external light is low, it is difficult to recognize the information. Especially, when no external light is available at night, it is impossible to use the information. Therefore, use of an additional illumination apparatus or a light emitting member, such as an LED, has been proposed. In recent years, finder apparatuses using, as display members, liquid crystal devices with backlight illumination gradually increased. In the field of such finder apparatuses using liquid crystal devices, a remarkable development is seen in so-called electronic viewfinders. The electronic viewfinders do not simply display a field-of-view frame, a target mark or the like, but can display also an electronic image of a subject image obtained by the imaging lens. Therefore, there is a growing demand for optical systems that can cope with electronic viewfinders.

Further, smaller liquid crystal devices than conventional devices were developed in recent years, and a reduction in the size of finders became requested as the size of apparatuses became smaller. Therefore, the size of display members and the size of display on the display members tend to become smaller, compared with conventional display members. Meanwhile, the angles of imaging lens systems became wider. Therefore, when information such as the field-of-view frame displayed in small size is superimposed on the subject image, the image of the field-of-view frame or the like needs to be magnified. Hence, the target lens needs to have extremely strong refractive power. Consequently, sufficient correction of aberrations becomes difficult, and it becomes more difficult to make the diopter scale of a central area of an image and the diopter scale of a peripheral area of the image uniform, compared with conventional finders. Further, in many conventional finder apparatuses, only a field-of-view frame and a target mark for measuring distance were displayed. Therefore, optical systems that pay attention only to the central area of the image and the peripheral area of the image were sufficient. However, in the electronic viewfinders, an image obtained by imaging is also displayed. Therefore, it is necessary that the optical system can provide excellent diopter scale conditions continuously from the central area of the image through the peripheral area of the image.

However, neither of Patent Document 1 and 2 considers a difference in diopter scale between the central area of the image and the peripheral area of the image. In Patent Document 3, a central area of an optical image frame, which is a display member, and a peripheral area of the optical image frame are arranged at different positions from each other along an optical axis to obtain an optical image, such as a field-of-view frame, in excellent diopter scale conditions. In Patent Document 4, at least one of surfaces of the target lens and the eyepiece lens is an aspheric surface, and the shape of the aspheric surface is regulated to provide an excellent view of the optical image frame.

However, in the technique disclosed in Patent Document 3, a display member that is curved based on the diopter scale conditions is necessary to obtain excellent diopter scale conditions continuously from the central area of the image through the peripheral area of the image. Therefore, it would be difficult to apply such a curved display member to an electronic viewfinder, the size of which became smaller in recent years. Further, the apparatus disclosed in Patent Document 4 assumes only a central area of the image, in which a distance measurement area is displayed, and a peripheral area of the image, in which an optical image frame is displayed, in an illuminating-window-type finder. Therefore, it is impossible to obtain excellent diopter scale conditions continuously from the central area of the image through the peripheral area of the image.

SUMMARY OF THE INVENTION

In view of the foregoing circumstances, it is an object of the present invention to provide a finder apparatus that can cope with a reduction in the size of an apparatus, a wider angle and an electronic viewfinder, and which can obtain excellent diopter scale conditions from a central area of an image through a peripheral area of the image. Further, it is another object of the present invention to provide an imaging apparatus including the finder apparatus.

A finder apparatus according to the present invention is a finder apparatus that superimposes, on an image formed by an observation optical system of a reverse-Galilean finder including an objective lens group having negative refractive power and an eyepiece lens group having positive refractive power, display on a display member arranged outside an optical path of the observation optical system by using an optical path combination member arranged between the objective lens group and the eyepiece lens group, thereby making a user observe the image on which the display is superimposed, the finder apparatus comprising:

a target lens group that guides light from the display member, and which is provided in an optical path from the display member to the eyepiece lens group, wherein the following formulas (1) and (2) are satisfied:

$$25.0 \text{ mm} \leq f2 < 40.0 \text{ mm} \quad (1); \text{ and}$$

$$15.0 \text{ mm} \leq fg < 27.0 \text{ mm} \quad (2), \text{ where}$$

$f2$ is the focal length of the eyepiece lens group, and $fg$ is a combined focal length from the target lens group through the eyepiece lens group.

In the formulas (1) and (2), "mm" represents millimeter, as the unit of length.

It is not necessary that each of the "objective lens group", the "eyepiece lens group", and the "target lens group" is composed of plural lenses. Any of them may be composed of a single lens.

In the formula (2), when an optical member without refractive power, such as a prism, is present in the optical path from the target lens group to the eyepiece lens group, a length in air is used as the thickness of the optical member without refractive power.

In the finder apparatus of the present invention, a most-display-member-side surface in the target lens group may be concave. In that case, it is desirable that the target lens group includes a cemented lens composed of a positive meniscus lens having a concave surface facing the display member side and a negative meniscus lens, which are cemented together in this order from the display member side.

Alternatively, in the finder apparatus of the present invention, the target lens group may include a negative lens having a concave surface facing the eyepiece lens group side, and which is arranged next to the display member or in the vicinity thereof. Here, the expression "next to the display member or in the vicinity thereof" means a position at a distance of approximately 2 mm or less from the display member when the distance is measured on the optical axis.

When the target lens group in the finder apparatus of the present invention includes a negative lens having a concave surface facing the eyepiece lens group side, and which is arranged next to the display member or in the vicinity thereof, it is desirable that the target lens group includes a lens having a concave surface facing the display member side, and which is arranged on the eyepiece lens group side of the negative lens with an air space between the lens and the negative lens. Further, when the finder apparatus of the present invention includes the negative lens, it is desirable that the target lens group includes a cemented lens composed of a positive meniscus lens having a concave surface facing the display member side and a negative meniscus lens, which are cemented together in this order from the display member side. Alternatively, it is desirable that the target lens group includes a cemented lens composed of a negative lens having a concave surface facing the display member side and a positive lens, which are cemented together in this order from the display member side.

The terms "positive" and "negative" about the refractive power of the lenses, and the term "meniscus" about the shape of the lenses refer to a paraxial region when a lens is an aspheric lens.

An imaging apparatus of the present invention includes a finder apparatus of the present invention.

According to the present invention, a finder apparatus including an observation optical system of a reverse-Galilean finder superimposes, on an image formed by the observation optical system, display on a display member, and makes a user observe the image on which the display is superimposed. In the finder apparatus, a target lens group that guides light from the display member is arranged in an optical path from the display member to an eyepiece lens group. Further, the finder apparatus satisfies the formulas (1) and (2) about the eyepiece lens group and the target lens group. Therefore, the finder apparatus of the present invention can cope with the trend in recent years, such as a reduction in the size of an apparatus, a wider angle and an electronic viewfinder. Further, excellent diopter scale conditions are obtainable from a central area of an image through a peripheral area of the image. Further, the present invention can provide an imaging apparatus including the finder apparatus.

BRIEF DESCRIPTION OF THE DRAWINGS

FIG. 16 is a cross section illustrating the structure of a finder apparatus in Example 3-1 of the present invention;

FIG. 17 is a cross section illustrating the structure of an observation optical system in a finder apparatus in Example 3-1 of the present invention;

FIG. 18 is a cross section illustrating the structure of a display optical system in a finder apparatus in Example 3-1 of the present invention;

FIGS. 19A, 19B, 19C, and 19D are diagrams illustrating aberrations (spherical aberrations, astigmatism, distortion, and lateral chromatic aberration, respectively) of the observation optical system in the finder apparatus in Example 1-1 of the present invention;

FIGS. 20A, 20B, 20C, and 20D are diagrams illustrating aberrations (spherical aberrations, astigmatism, distortion, and lateral chromatic aberration, respectively) of the display optical system in the finder apparatus in Example 1-1 of the present invention;

FIGS. 21A, 21B, 21C, and 21D are diagrams illustrating aberrations (spherical aberrations, astigmatism, distortion, and lateral chromatic aberration, respectively) of the display optical system in the finder apparatus in Example 1-2 of the present invention;

FIGS. 22A, 22B, 22C, and 22D are diagrams illustrating aberrations (spherical aberrations, astigmatism, distortion, and lateral chromatic aberration, respectively) of the display optical system in the finder apparatus in Example 2-1 of the present invention;

FIGS. 23A, 23B, 23C, and 23D are diagrams illustrating aberrations (spherical aberrations, astigmatism, distortion, and lateral chromatic aberration, respectively) of the display optical system in the finder apparatus in Example 2-2 of the present invention;

FIGS. 24A, 24B, 24C, and 24D are diagrams illustrating aberrations (spherical aberrations, astigmatism, distortion, and lateral chromatic aberration, respectively) of the observation optical system in the finder apparatus in Example 2-3 of the present invention;

FIGS. 25A, 25B, 25C, and 25D are diagrams illustrating aberrations (spherical aberrations, astigmatism, distortion, and lateral chromatic aberration, respectively) of the display optical system in the finder apparatus in Example 2-3 of the present invention;

FIGS. 26A, 26B, 26C, and 26D are diagrams illustrating aberrations (spherical aberrations, astigmatism, distortion, and lateral chromatic aberration, respectively) of the observation optical system in the finder apparatus in Example 2-4 of the present invention;

FIGS. 27A, 27B, 27C, and 27D are diagrams illustrating aberrations (spherical aberrations, astigmatism, distortion, and lateral chromatic aberration, respectively) of the display optical system in the finder apparatus in Example 2-4 of the present invention;

FIGS. 28A, 28B, 28C, and 28D are diagrams illustrating aberrations (spherical aberrations, astigmatism, distortion, and lateral chromatic aberration, respectively) of the observation optical system in the finder apparatus in Example 2-5 of the present invention;

FIGS. 29A, 29B, 29C, and 29D are diagrams illustrating aberrations (spherical aberrations, astigmatism, distortion, and lateral chromatic aberration, respectively) of the display optical system in the finder apparatus in Example 2-5 of the present invention;

FIGS. 30A, 30B, 30C, and 30D are diagrams illustrating aberrations (spherical aberrations, astigmatism, distortion, and lateral chromatic aberration, respectively) of the observation optical system in the finder apparatus in Example 3-1 of the present invention;

FIGS. 33A, 33B, 33C, and 33D are diagrams illustrating aberrations (spherical aberrations, astigmatism, distortion, and lateral chromatic aberration, respectively) of a display optical system in the finder apparatus in Comparative Example 1;

FIGS. 34A, 34B, 34C, and 34D are diagrams illustrating aberrations (spherical aberrations, astigmatism, distortion, and lateral chromatic aberration, respectively) of an observation optical system in a finder apparatus in Comparative Example 2;

DESCRIPTION OF THE PREFERRED EMBODIMENTS

Figure 1:
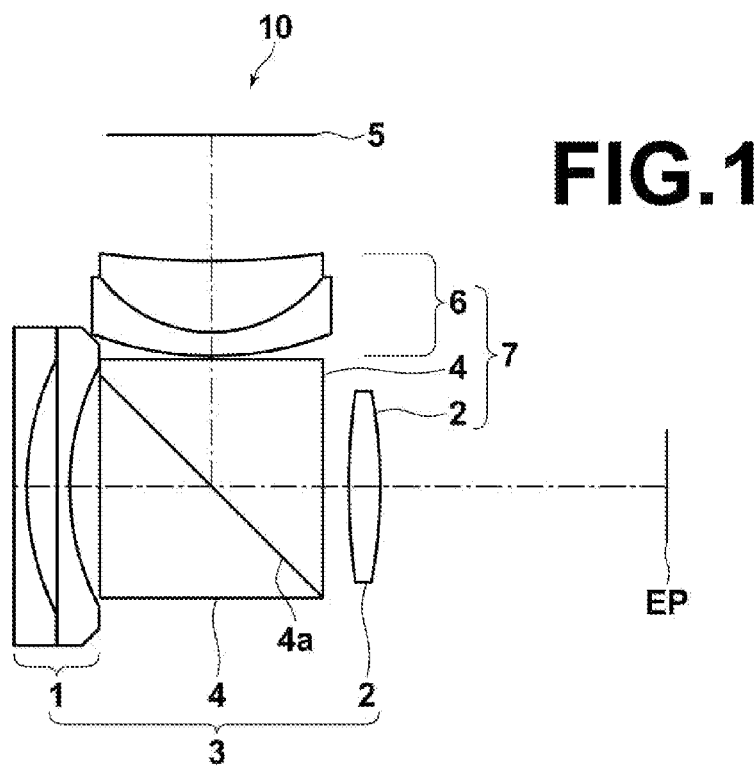
FIG. 1 is a cross section illustrating the structure of a finder apparatus according to a first embodiment of the present invention.

Hereinafter, embodiments of the present invention will be described in detail with reference to drawings. FIG. 1 is a diagram illustrating the structure of a finder apparatus according to a first embodiment of the present invention. A finder apparatus 10 illustrated in FIG. 1 is mounted, for example, in an imaging apparatus, such as a camera, which includes an imaging lens.

The finder apparatus 10 includes an observation optical system 3 of a reverse-Galilean finder, which includes an objective lens group 1 having negative refractive power and an eyepiece lens group 2 having positive refractive power. Further, a half prism 4, which is an optical path combination member, is arranged in an optical path between the objective lens group 1 and the eyepiece lens group 2. Further, a semi-transparent layer 4a is provided on an inclined plane in the half prism 4. The semi-transparent layer 4a divides light that has entered the half prism 4 perpendicularly to a light incident surface of the half prism 4 into transmission light and reflection light. FIG. 1 illustrates an example in which the half prism 4 is used as the optical path combination member. However, the optical path combination member of the present invention is not limited to the half prism, and a different member, such as a half mirror, having a similar function to the half prism 4 may be used as the optical path combination member.

In the observation optical system 3 of the finder apparatus 10, light from a subject image obtained through an imaging lens (which is not illustrated) passes through the objective lens group 1, the half prism 4, and the eyepiece lens group 2 in this order. Further, this subject image is observed at eye point EP.

Further, the finder apparatus 10 includes a display member 5 and a target lens group 6. The display member 5 is arranged in an optical path that is perpendicular to the optical path of the observation optical system 3, and that passes through the semitransparent layer 4a in the half prism 4. The display member 5 may be a simple so-called bright frame (optical image frame). Alternatively, the display member 5 may be a liquid crystal device. The content or information displayed on the display member 5 are, for example, a field-of-view frame, a distance measurement range, a light measurement range, a stop, shutter speed, exposure, the number of photographs taken, an image already obtained by photography, or the like.

The target lens group 6 is arranged in an optical path from the display member 5 to the eyepiece lens group 2, and guides light from the display member 5 to the eyepiece lens group 2. In the example illustrated in FIG. 1, the target lens group 6 is a cemented lens, which is a pair of lenses, arranged between the display member 5 and the half prism 4.

The target lens group 6, the half prism 4 and the eyepiece lens group 2 constitute a display optical system 7. In the display optical system 7 in the finder apparatus 10, light from the display on the display member 5 passes through the target lens group 6, and is reflected by the half prism 4. Further, the reflected light passes through the eyepiece lens group 2, and enters eye point EP. Accordingly, display on the display member 5 is superimposed on a subject image formed by the observation optical system 3, and observed at the eye point EP.

The finder apparatus 10 is constructed in such a manner to satisfy the following formulas (1) and (2):

$$25.0 \text{ mm} \leq f2 < 40.0 \text{ mm} \quad (1); \text{ and}$$

$$15.0 \text{ mm} \leq fg < 27.0 \text{ mm} \quad (2),$$

where f2 is the focal length of the eyepiece lens group 2, and fg is a combined focal length from the target lens group 6 through the eyepiece lens group 2 in the display optical system 7. The combined focal length fg is calculated by using a length in air as the thickness of the half prism 4.

First, the formula (1) will be explained. When the focal length of the objective lens group 1 is −f1 (the unit is mm, and the value of f1 is a positive value), and the focal length of the eyepiece lens group 2 is f2 (the unit is mm), if both of the objective lens group 1 and the eyepiece lens group 2 are regarded as thin lenses, and the observation optical system 3 is an afocal system, distance D between principal points of the objective lens group 1 and the eyepiece lens group 2 and finder magnification β of the observation optical system 3 are represented by the following equations (A) and (B), respectively:

$$D = f2 - f1 \quad (A); \text{ and}$$

$$\beta = f1/f2 \quad (B).$$

When a case of mounting the finder apparatus of the present invention in a general camera of recent years is assumed, the thickness of the camera is approximately 20 to 30 mm in the direction of the optical axis. Meanwhile, the distance D between the principal points, represented by the equation (A), is a distance in air. In many actual cameras, prisms are inserted into optical paths. Therefore, when a prism having a refractive index in the range of 1.5 to 1.8 is inserted into the optical path of the camera, it is appropriate to think that the distance D between the principal points is in the range of 10 to 25 mm, and more appropriate to think that the distance D between the principal points is in the range of 15 to 20 mm.

The finder magnification β of an afocal system is the ratio of the size of an image observed through the observation optical system 3 of the finder apparatus 10 with respect to the size of an image obtained by the imaging lens. The finder magnification β is representable by an angular magnification. Here, an imaging lens with the focal length in the range of 25 mm to 40 mm is assumed as a general imaging lens. If a conventional general-purpose imaging lens corresponding to 135 film is considered, the horizontal full angle of view is approximately 48.5 degrees when the focal length of the imaging lens is 40 mm, and the horizontal full angle of view is approximately 71.5 degrees when the focal length of the imaging lens is 25 mm. Therefore, a wide angle lens having a horizontal full angle of view in the range of approximately 50 to 70 degrees is assumed.

It is said that easy viewing through a finder is possible when the apparent field of view of the finder is a horizontal full angle of view in the range of approximately 20 to 25 degrees. If the apparent field of view of the finder is too narrow, a user experiences a sense of peeping through a tiny hole. If the apparent field of view of the finder is too wide, it is difficult to look at the entire area of view at the same time. The finder magnification is represented by angular magnification. Therefore, the maximum value of the finder magnification is $\tan(25/2)/\tan(50/2) \approx 0.48$ when the aforementioned value of the horizontal full angle of view is used. Further, the minimum value of the finder magnification is $\tan(20/2)/\tan(70/2) \approx 0.25$. Since it becomes difficult to recognize what is seen when the finder magnification is too small, an appropriate finder magnification β for practical use is considered to be in the range of 0.4 to 0.5.

Figure 2:
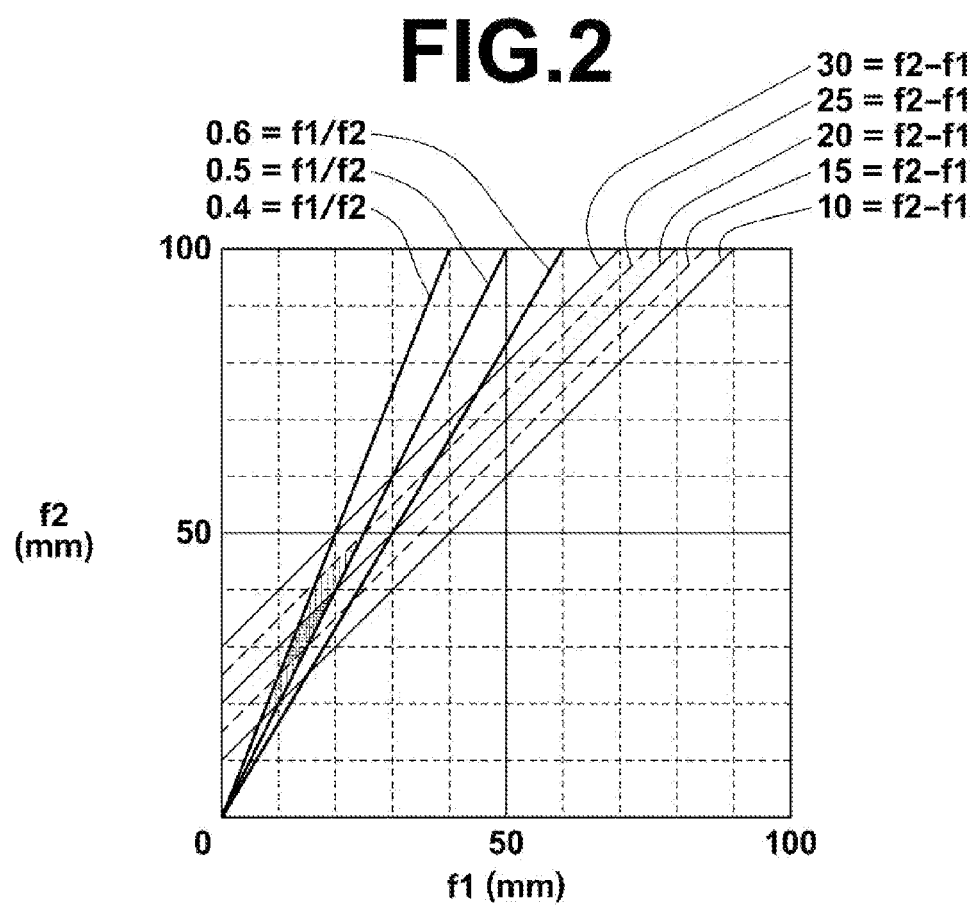
FIG. 2 is a diagram for explaining an appropriate focal length of an eyepiece lens.

As the equations (A) and (B) show, the distance D between the principal points and the finder magnification β are functions of f1 and f2. FIG. 2 is a diagram illustrating functions represented by the equations (A) and (B). In FIG. 2, the horizontal axis is f1, and the vertical axis is f2. FIG. 2 illustrates functions when distance D between principal points is at 10, 15, 20, 25 and 30, and when the finder magnification β is at 0.4, 0.5 and 0.6.

In FIG. 2, appropriate ranges of the distance D between the principal points and the finder magnification β are indicated by hatching. A range defined by the distance D between the principal points in the range of 10 to 25 mm and the finder magnification β in the range of 0.4 to 0.5 is indicated by vertical hatching. Further, a range defined by the distance D between the principal points in the range of 15 to 20 mm and the finder magnification β in the range of 0.4 to 0.5 is indicated by horizontal hatching. An appropriate range of the focal length f2 of the eyepiece lens can be obtained based on the area indicated by horizontal hatching in FIG. 2, and the formula (1) is obtained.

When the value of f2 is lower than the lower limit defined by the formula (1), the finder magnification becomes high, and it becomes difficult to cope with a wide-angle imaging lens. When the value of f2 exceeds the upper limit defined by the formula (1), a reduction in size becomes difficult. Specifically, it becomes difficult to reduce the thickness of the apparatus.

Figure 3:
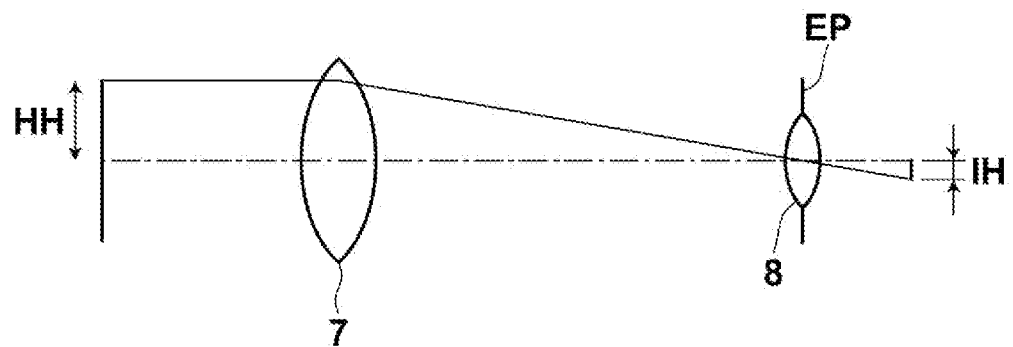
FIG. 3 is a schematic diagram illustrating an optical system composed of a display optical system and an eye.

Next, with reference to FIG. 3, the formula (2) will be explained. FIG. 3 is a schematic diagram illustrating an optical system composed of a display optical system 7 and an eye 8 of a user who looks through a finder. The eye 8 is located at eye point EP. In the following study, the eye 8 is a lens without aberration, and the focal length of the eye 8 is fe. First, a case in which the apparent field of view of the finder is a horizontal full angle of view of 25 degrees will be considered. When an image is formed on the retina of the user by rays in the apparent field of view having the horizontal full angle of view of 25 degrees, size IH of this image on the retina in the horizontal direction is represented by the following equation (C):

$$IH=2\times\tan(25/2)\times fe (\approx 0.443 fe) \quad (C).$$

When the size of the display member 5 in the horizontal direction is HH, the magnification of the optical system composed of the display optical system 7 and the eye 8 is represented by the following equation (D) by using combined focal length fg from the target lens group 6 through the eyepiece lens group 2, and focal length fe of the eye 8:

$$HH:IH=fg:fe \quad (D).$$

In recent years, electronic viewfinders are used in many products. Therefore, for example, a liquid crystal device is considered as the display member 5. When the diagonal size of a liquid crystal device used for this purpose is in the range of approximately 8 to 12 mm, if the aspect ratio of the liquid crystal device is 4:3, the size of the liquid crystal device in the horizontal direction is in the range of approximately 6.4 mm to 9.6 mm.

Further, the equation (D) is transformed into the following form:

$$fg=(HH/IH)\times fe.$$

In this equation, the aforementioned size of the display member 5 in the horizontal direction, which is 6.4 mm through 9.6 mm, is substituted for HH, and the solution of the equation (C) is substituted for IH. Then, the value of fg is 14.46 mm through 21.67 mm.

When the apparent angle of view is a horizontal full angle of view of 20 degrees, the following equation (C') is used instead of the equation (C):

$$IH=2\times\tan(20/2)\times fe(\approx 0.353 fe) \quad (C').$$

When similar calculation is performed by using the equation (C'), the value of fg is 18.13 mm through 27.20 mm.

Specifically, when a display member having a diagonal size of 12 mm (horizontal size of 9.6 mm) is used, it is necessary that the focal length is 27.20 mm to obtain the horizontal apparent angle of view of 20 degrees. Further, it is necessary that the focal length is 21.67 mm to obtain the horizontal apparent angle of view of 25 degrees. When a display member having a diagonal size of 8 mm (horizontal size of 6.4 mm) is used, it is necessary that the focal length is 18.13 mm to obtain the horizontal apparent angle of view of 20 degrees. Further, it is necessary that the focal length is 14.46 mm to obtain the horizontal apparent angle of view of 25 degrees. Consequently, the formula (2) is obtained.

When the value of fg is lower than the lower limit defined by the formula (2), the apparent angle of view is too wide, and it becomes difficult to obtain excellent diopter scale conditions from the central area of an image through the peripheral area of the image. When the value of fg exceeds the upper limit defined by the formula (2), the apparent angle of view is too narrow, and it becomes difficult to cope with a wide-angle imaging lens. Further, it becomes difficult to reduce the size of the system, in other words, to reduce the thickness of the apparatus.

The formula (2) is based on our study on finders including electronic viewfinders of recent years. Therefore, when the eyepiece lens group 2 and the target lens group 6 are constructed so as to satisfy the formulas (1) and (2), it is possible to provide a finder apparatus that can cope with the trend in recent years, such as a reduction in size, a wider angle, and electronic viewfinders. Further, the finder apparatus has excellent diopter scale conditions from the central area of an image through the peripheral area of the image.

Next, the construction of the target lens group 6 will be described in detail. The target lens group 6 according to the first embodiment of the present invention has a relatively wide air space between a most-display-member-side surface of the target lens group 6 and the display member 5. In the example illustrated in FIG. 1, the air space between the display member 5 and the most-display-member-side surface of the target lens group 6 is greater than the center thickness of a cemented lens included in the target lens group 6.

In the target lens group 6, which has a relatively wide air space between the most-display-member-side surface of the target lens group 6 and the display member 5, it is desirable that the most-display-member-side surface of the target lens group 6 is a concave surface. When the surface is concave, it is possible to provide excellent diopter scale conditions from the central area of the image through the peripheral area of the image, while a difference in diopter scale between the central area of the image and the peripheral area of the image is suppressed.

For example, as illustrated in FIG. 1, it is desirable that the target lens group 6 includes a cemented lens composed of a positive meniscus lens having a concave surface facing the display member side and a negative meniscus lens, which are cemented together in this order from the display member side. Accordingly, it is possible to provide excellent diopter scale conditions, and to correct chromatic aberrations in an excellent manner.

The target lens group 6 may consist of only the cemented lens as described above. In that case, the aforementioned advantageous effects are achievable while the target lens group 6 has simple construction. Alternatively, the target lens group 6 may be composed of two cemented lenses, each constructed as described above. In that case, it is possible to correct chromatic aberrations in a more excellent manner, compared with the case of using only one cemented lens.

Figure 4:
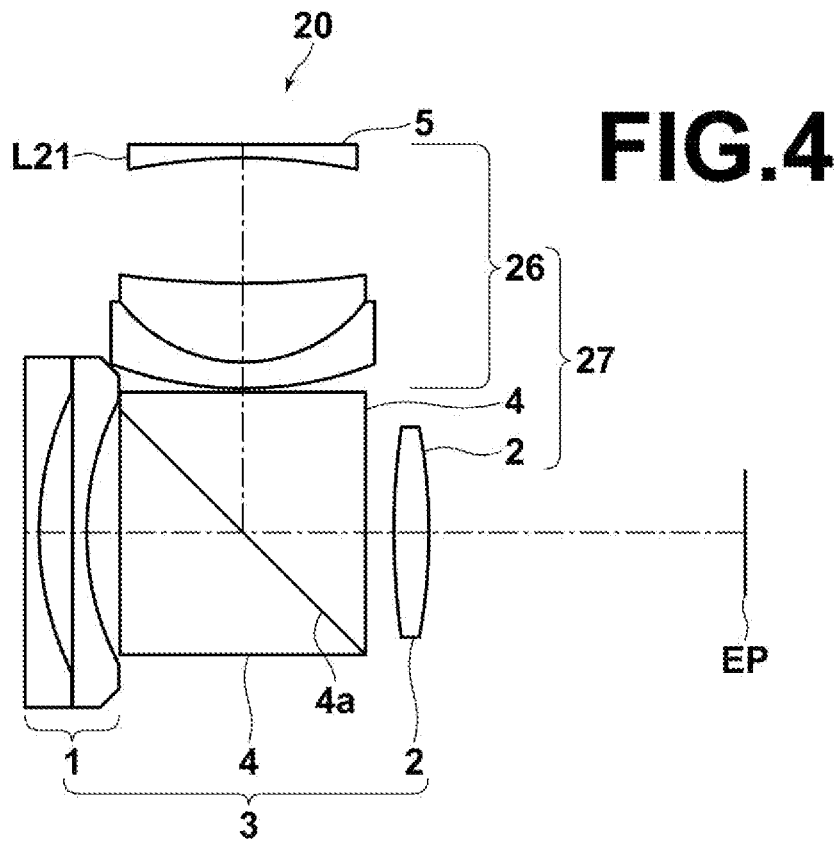
FIG. 4 is a cross section illustrating the structure of a finder apparatus according to a second embodiment of the present invention.

Next, with reference to FIG. 4, a finder apparatus 20 according to a second embodiment of the present invention will be described. FIG. 4 is a diagram illustrating the structure of the finder apparatus 20 according to the second embodiment of the present invention. The finder apparatus 20 basically differs from the finder apparatus 10 according to the first embodiment in that a target lens group 26 is included instead of the target lens group 6, and the other construction is the same as the finder apparatus 10. Therefore, the same signs as those used in FIG. 1 are assigned to the same elements in FIG. 4, and the explanation of the signs is omitted.

In the finder apparatus 20 according to the second embodiment of the present invention, a display optical system 27 is composed of the target lens group 26, a half prism 4, and an eyepiece lens group 2. The functions of the target lens group 26 and the display optical system 27 are similar to those of the target lens group 6 and the display optical system 7, which were described in the first embodiment. Further, the finder apparatus 20 according to the second embodiment of the present invention also satisfies the formulas (1) and (2), which were described in the explanation of the finder apparatus 10 according to the first embodiment.

The target lens group 26 in the second embodiment of the present invention includes negative lens L21 having a concave surface facing the eyepiece lens group side, and which is arranged next to a display member 5 or in the vicinity thereof. For example, as illustrated in FIG. 4, the target lens group 26 is composed of negative lens L21 and a cemented lens, which are arranged in this order from the display member side. The negative lens L21 is a plano-concave-shaped single lens having a concave surface facing the eyepiece lens group side. The cemented lens is composed of a positive meniscus lens having a concave surface facing the display member side and a negative meniscus lens, which are cemented together in this order from the display member side. In the example illustrated in FIG. 4, the display member 5 and the negative lens L21 are in contact with each other, and the display-member-side surface of the lens L21, which is a flat surface, and the display member 5 are positioned on the same plane.

When the negative lens L21 having a concave surface facing the eyepiece lens group side is arranged next to the display member 5 or in the vicinity thereof, it becomes possible to more easily keep excellent diopter scale conditions from the central area of the image through the peripheral area of the image.

When the negative lens L21 is arranged in real situations, it is necessary to consider a protection member of the display member 5 and a holding member for holding the display member 5. In many cases, the negative lens L21 and the display member 5 are arranged with a very small space therebetween, and the negative lens L21 is arranged at a distance of approximately 2 mm or less from the display member 5 when the distance is measured on the optical axis. Further, it is desirable that the display-member-side surface of the negative lens L21 is a flat surface. In that case, the production characteristics become higher, and it becomes possible to easily obtain stable excellent diopter scale conditions.

In the target lens group 26 in the second embodiment of the present invention, it is desirable that a lens having a concave surface facing the display member side is arranged on the eyepiece lens group side of the negative lens L21 with an air space between the lens and the negative lens L21. When the target lens group 26 is constructed in such a manner, it is possible to more easily keep excellent diopter scale conditions from the central area of the image through the peripheral area of the image. In this case, it is desirable that the air space between the negative lens L21 and the concave surface of the lens, which faces the eyepiece lens group side of the negative lens L21, is the widest air space among spaces between lenses in the target lens group 26. When the target lens group 26 is constructed in such a manner, it is possible to more easily keep excellent diopter scale conditions from the central area of the image through the peripheral area of the image.

It is desirable that the target lens group 26 in the second embodiment of the present invention includes a cemented lens composed of a positive meniscus lens having a concave surface facing the display member side and a negative meniscus lens, which are cemented together in this order from the display member side. When the target lens group 26 includes such a cemented lens, it is possible to achieve excellent diopter scale conditions, and to correct chromatic aberrations in an excellent manner.

The target lens group 26 may include only one cemented lens composed of a positive meniscus lens having a concave surface facing the display member side and a negative meniscus lens. Alternatively, the target lens group 26 may include two cemented lenses. When the target lens group 26 includes the two cemented lenses, it is possible to improve the effect of correcting chromatic aberrations.

Alternatively, the target lens group 26 may include a cemented lens composed of a negative lens having a concave surface facing the display member side and a positive lens, which are cemented together in this order from the display member side. When the target lens group 26 includes such a cemented lens, it is possible to easily suppress a difference in diopter scale between the central area of the image and the peripheral area of the image. Further, it is possible to correct chromatic aberrations in an excellent manner. For example, this cemented lens may be composed of a double-concave lens and a double-convex lens, which are cemented together.

The target lens group 26 may include both of a cemented lens composed of a negative lens having a concave surface facing the display member side and a positive lens and a cemented lens composed of a positive meniscus lens having a concave surface facing the display member side and a negative meniscus lens. When the target lens group 26 is constructed in such a manner, it is possible to more easily keep excellent diopter scale conditions from the central area of an image through the peripheral area of the image. Further, it is possible to correct chromatic aberrations in an excellent manner.

As described above, the finder apparatuses according to the embodiments of the present invention can keep excellent diopter scale conditions from the central area of an image through the peripheral area of the image. The finder apparatuses are appropriate for electronic viewfinders that became popularly used in recent years. Meanwhile, the main purpose of most of conventional finder apparatuses was to display a field-of-view frame or a distance measurement area. Therefore, correction of lateral chromatic aberrations was insufficient. In contrast, the finder apparatuses according to the embodiments of the present invention, in which a target lens group including a cemented lens or lenses as described above is provided, can correct lateral chromatic aberrations in an excellent manner.

Next, examples of numerical values of optical systems constituting the finder apparatus according to the present invention will be described. The representation method of lens data and aberration diagrams will be described with respect to Example 1-1. Since lens data and aberration diagrams of the other examples and comparative examples are represented in a similar manner to Example 1-1, explanations thereof will be omitted. Further, in the diagrams illustrating the structure of examples, signs based on the concepts of the aforementioned embodiments are assigned to the objective lens group 1, the eyepiece lens group 2, the half prism 4, and the target lens groups 6, 26.

Example 1-1

Figure 5:
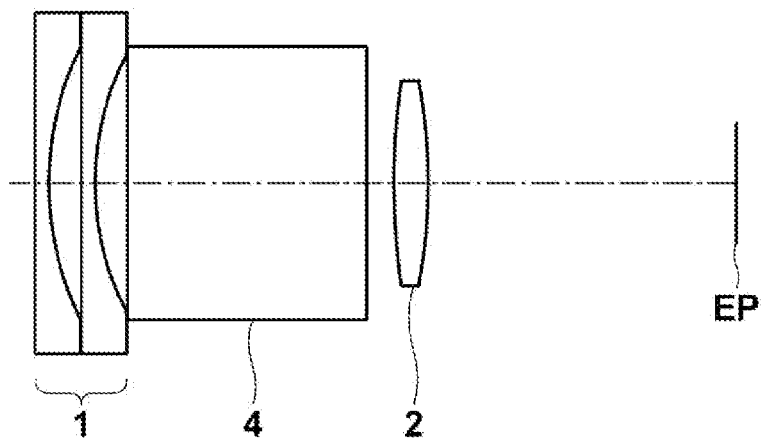
FIG. 5 is a cross section illustrating the structure of an observation optical system in a finder apparatus in Example 1-1 of the present invention.
Figure 6:
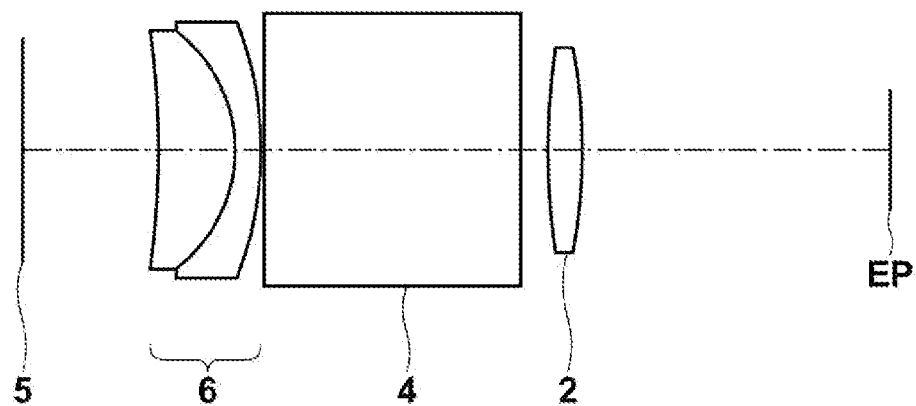
FIG. 6 is a cross section illustrating the structure of a display optical system in a finder apparatus in Example 1-1 of the present invention.

FIGS. 5 and 6 are cross sections of an observation optical system and a display optical system of a finder apparatus in Example 1-1, respectively. The optical path is developed in FIG. 6. A target lens group 6 in Example 1-1 is composed of a cemented lens in which a positive meniscus lens having a concave surface facing the display member side and a negative meniscus lens are cemented together in this order from the display member side. A distance between the display member 5 and this cemented lens is 7.94 mm when the distance is measured on the optical axis.

Tables 1 and 2 show lens data about the observation optical system in Example 1-1 and lens data about the display optical system in Example 1-1, respectively. In the tables of the lens data, the column of Si shows surface numbers. The object-side surface of the most-object-side element is the first surface, and the surface numbers sequentially increase toward the image side (i=1, 2, 3, . . . ). The column of Ri shows the radius of curvature of the i-th surface, and the column of Di shows a distance between the i-th surface and the (i+1)th surface on optical axis Z. The column of Ndj shows the refractive index of a j-th optical element with respect to d-line (wavelength is 587.6 nm) when the most-object-side optical element is the first optical element and the value of j sequentially increases toward the image side (j=1, 2, 3, . . . ). Further, the column of νdj shows the Abbe number of the j-th optical element with respect to d-line.

The sign (positive/negative) of the radius of curvature is positive when the shape of a surface is convex toward the object side, and negative when the shape of a surface is convex toward the image side. In the lens data, "mm" is used as the unit of the radius of curvature, and as the unit of a distance between surfaces. In the tables, values are rounded off to predetermined decimal places.

TABLE 1

EXAMPLE 1-1 OBSERVATION OPTICAL SYSTEM

| Si | Ri | Di | Ndj | vdj |
|---|---|---|---|---|
| 1 | ∞ | 0.80 | 1.62041 | 60.30 |
| 2 | 18.245 | 1.90 | | |
| 3 | ∞ | 0.80 | 1.51680 | 64.20 |
| 4 | 16.508 | 1.90 | | |
| 5 | ∞ | 14.00 | 1.51680 | 64.20 |
| 6 | ∞ | 1.60 | | |
| 7 | 41.740 | 2.00 | 1.62041 | 60.30 |
| 8 | −33.568 | | | |

TABLE 2

EXAMPLE 1-1 DISPLAY OPTICAL SYSTEM

| Si | Ri | Di | Ndj | vdj |
|---|---|---|---|---|
| 1 | −51.959 | 4.50 | 1.80400 | 46.57 |
| 2 | −8.803 | 1.50 | 1.84666 | 23.78 |
| 3 | −21.008 | 0.20 | | |
| 4 | ∞ | 15.00 | 1.51680 | 64.20 |
| 5 | ∞ | 1.60 | | |
| 6 | 41.740 | 2.00 | 1.62041 | 60.30 |
| 7 | −33.568 | | | |

FIGS. 19A through 19D are diagrams illustrating aberrations of the observation optical system in the finder apparatus of Example 1-1. FIGS. 19A through 19D illustrate spherical aberrations, astigmatisms, distortion and lateral chromatic aberrations, respectively. Each of the diagrams illustrates aberrations based on d-line. In the diagrams illustrating spherical aberrations and lateral chromatic aberrations, aberrations related to F-line (wavelength is 486.1 nm) and C-line (wavelength is 656.3 nm) are also illustrated. In the diagram illustrating astigmatisms, an aberration in the sagittal direction is indicated by a solid line, and an aberration in the tangential direction is indicated by a dotted line.

In the diagram illustrating spherical aberrations, the diameter of a pupil (unit is mm) used in calculation of aberrations is written at the top of the vertical axis of the diagram. Specifically, FIG. 19A illustrates spherical aberrations when the diameter of the pupil is φ3.5 mm. In the diagrams illustrating astigmatisms, distortion and lateral chromatic aberrations, the vertical axes represent the angles of emergence of principal rays with respect to the optical axis. Further, the maximum angles of emergence are written at the top of the vertical axes of these diagrams. In the diagrams illustrating spherical aberrations and astigmatisms, the horizontal axis represents diopter scale, and the unit is D, which represents diopter. In the diagram illustrating lateral chromatic aberrations, the horizontal axis represents angles, and the unit is second.

Similarly, FIGS. 20A through 20D are diagrams illustrating various aberrations of the display optical system in the finder apparatus of Example 1-1. FIGS. 20A through 20D illustrate spherical aberrations, astigmatisms, distortion and lateral chromatic aberrations, respectively.

Example 1-2

Figure 7:
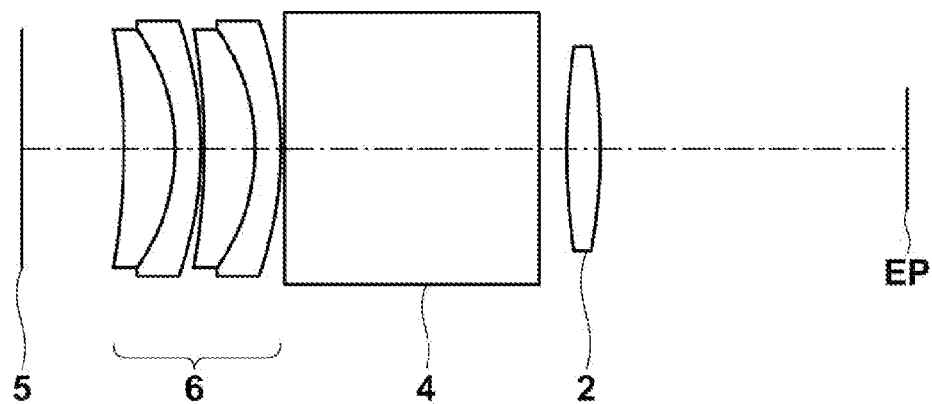
FIG. 7 is a cross section illustrating the structure of a display optical system in a finder apparatus in Example 1-2 of the present invention.

FIG. 7 is a cross section of a display optical system in a finder apparatus of Example 1-2. The optical path is developed in FIG. 7. A target lens group 6 in Example 1-2 is composed of two cemented lenses. In each of the cemented lenses, a positive meniscus lens having a concave surface facing the display member side and a negative meniscus lens are cemented together in this order from the display member side. A distance between the display member 5 and the object-side cemented lens on the optical axis is 6.00 mm. An observation optical system of the finder apparatus in Example 1-2 is the same as the observation optical system in Example 1-1. Therefore, a diagram illustrating the structure of the observation optical system of Example 1-2 and lens data about the observation optical system of Example 1-2 are omitted.

Table 3 shows lens data about the display optical system in Example 1-2. FIGS. 21A through 21D are diagrams illustrating various aberrations of the display optical system in Example 1-2.

TABLE 3

EXAMPLE 1-2 DISPLAY OPTICAL SYSTEM

| Si | Ri | Di | Ndj | vdj |
|---|---|---|---|---|
| 1 | −40.100 | 3.00 | 1.69680 | 55.60 |
| 2 | −12.025 | 1.50 | 1.84666 | 23.78 |
| 3 | −22.472 | 0.20 | | |
| 4 | −40.100 | 3.00 | 1.69680 | 55.60 |
| 5 | −12.025 | 1.50 | 1.84666 | 23.78 |
| 6 | −22.472 | 0.20 | | |
| 7 | ∞ | 15.00 | 1.51680 | 64.20 |
| 8 | ∞ | 1.60 | | |
| 9 | 41.740 | 2.00 | 1.62041 | 60.30 |
| 10 | −33.568 | | | |

Example 2-1

Figure 8:
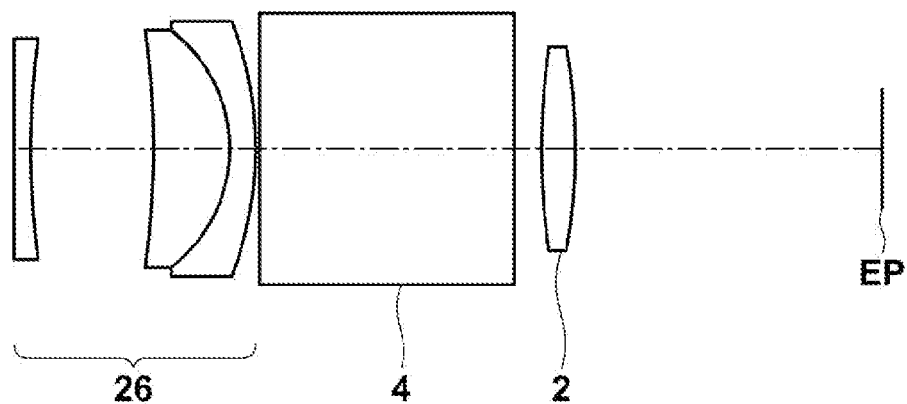
FIG. 8 is a cross section illustrating the structure of a display optical system in a finder apparatus in Example 2-1 of the present invention.

FIG. 8 is a cross section of a display optical system in a finder apparatus of Example 2-1. The optical path is developed in FIG. 8. A target lens group 26 in Example 2-1 has 2-group 3-element structure, and is composed of a negative lens and a cemented lens. The negative lens is arranged in close contact with the display member 5. An observation optical system of the finder apparatus in Example 2-1 is the same as the observation optical system in Example 1-1. Therefore, a diagram illustrating the structure of the observation optical system of Example 2-1 and lens data about the observation optical system of Example 2-1 are omitted.

Table 4 shows lens data about the display optical system in Example 2-1. FIGS. 22A through 22D are diagrams illustrating various aberrations of the display optical system in Example 2-1.

TABLE 4

EXAMPLE 2-1 DISPLAY OPTICAL SYSTEM

| Si | Ri | Di | Ndj | vdj |
|---|---|---|---|---|
| 1 | ∞ | 1.00 | 1.51680 | 64.20 |
| 2 | 50.000 | 7.20 | | |
| 3 | −51.959 | 4.50 | 1.80400 | 46.57 |
| 4 | −8.803 | 1.50 | 1.84666 | 23.78 |
| 5 | −21.008 | 0.20 | | |
| 6 | ∞ | 15.00 | 1.51680 | 64.20 |
| 7 | ∞ | 1.60 | | |
| 8 | 41.740 | 2.00 | 1.62041 | 60.30 |
| 9 | −33.568 | | | |

Example 2-2

Figure 9:
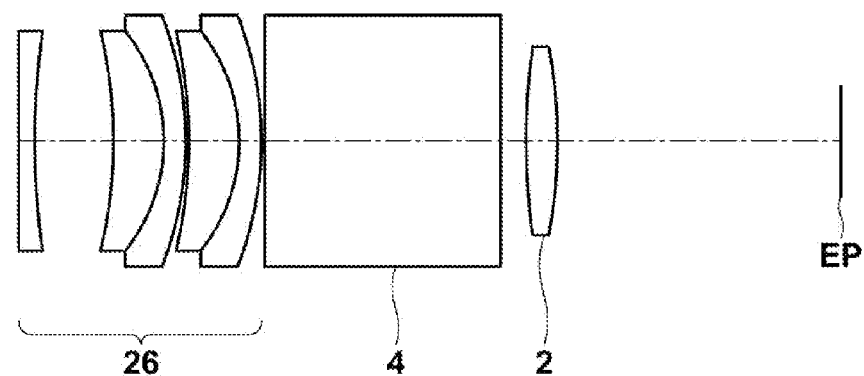
FIG. 9 is a cross section illustrating the structure of a display optical system in a finder apparatus in Example 2-2 of the present invention.

FIG. 9 is a cross section of a display optical system in a finder apparatus of Example 2-2. The optical path is developed in FIG. 9. A target lens group 26 in Example 2-2 has 3-group 5-element structure, and is composed of a negative lens and two cemented lenses. The negative lens is arranged in close contact with the display member 5. An observation optical system of the finder apparatus in Example 2-2 is the same as the observation optical system in Example 1-1. Therefore, a diagram illustrating the structure of the observation optical system of Example 2-2 and lens data about the observation optical system of Example 2-2 are omitted.

Table 5 shows lens data about the display optical system in Example 2-2. FIGS. 23A through 23D are diagrams illustrating various aberrations of the display optical system in Example 2-2.

TABLE 5

EXAMPLE 2-2 DISPLAY OPTICAL SYSTEM

| Si | Ri | Di | Ndj | vdj |
|---|---|---|---|---|
| 1 | ∞ | 1.00 | 1.51680 | 64.20 |
| 2 | 50.000 | 5.00 | | |
| 3 | −30.502 | 3.20 | 1.77250 | 49.60 |
| 4 | −11.221 | 1.40 | 1.84666 | 23.78 |
| 5 | −21.791 | 0.20 | | |
| 6 | −30.502 | 3.20 | 1.77250 | 49.60 |
| 7 | −11.221 | 1.40 | 1.84666 | 23.78 |
| 8 | −21.791 | 0.20 | | |
| 9 | ∞ | 15.00 | 1.51680 | 64.20 |
| 10 | ∞ | 1.60 | | |
| 11 | 41.740 | 2.00 | 1.62041 | 60.30 |
| 12 | −33.568 | | | |

Example 2-3

Figure 10:
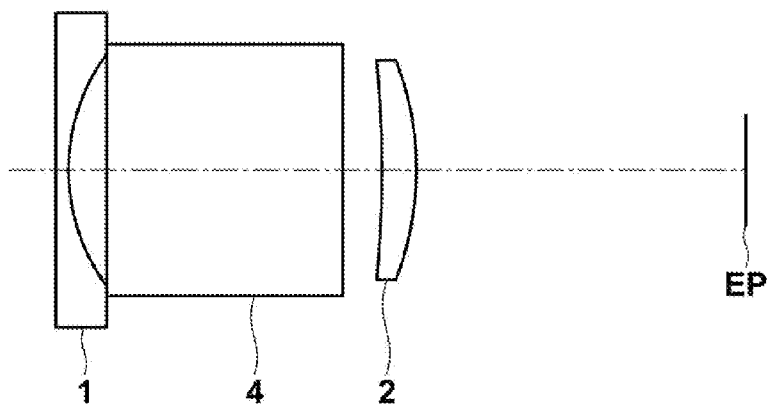
FIG. 10 is a cross section illustrating the structure of an observation optical system in a finder apparatus in Example 2-3 of the present invention.
Figure 11:
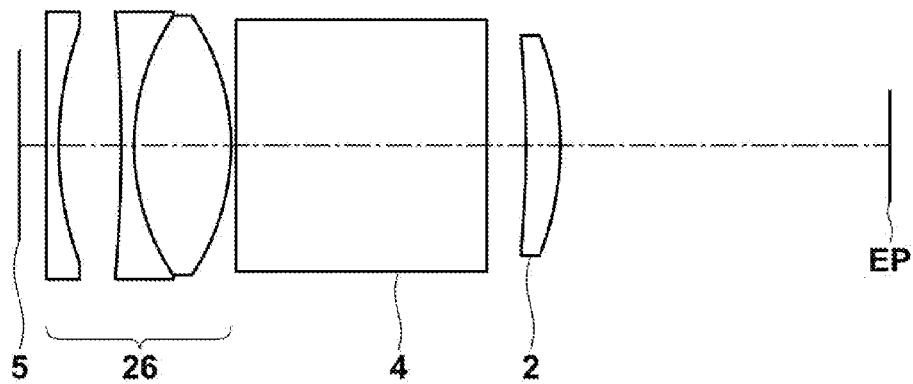
FIG. 11 is a cross section illustrating the structure of a display optical system in a finder apparatus in Example 2-3 of the present invention.

FIGS. 10 and 11 are cross sections of an observation optical system and a display optical system of a finder apparatus in Example 2-3, respectively. The optical path is developed in FIG. 11. A target lens group 26 in Example 2-3 has 2-group 3-element structure, and is composed of a negative lens and a cemented lens. The negative lens is arranged in such a manner that a distance between the display member 5 and the negative lens is 1.70 mm.

Tables 6 and 7 show lens data about the observation optical system in Example 2-3 and lens data about the display optical system in Example 2-3, respectively. FIGS. 24A through 24D are diagrams illustrating various aberrations of the observation optical system in Example 2-3. FIGS. 25A through 25D are diagrams illustrating various aberrations of the display optical system in Example 2-3.

TABLE 6

EXAMPLE 2-3 OBSERVATION OPTICAL SYSTEM

| Si | Ri | Di | Ndj | vdj |
|---|---|---|---|---|
| 1 | ∞ | 0.80 | 1.72916 | 54.68 |
| 2 | 12.429 | 2.50 | | |
| 3 | ∞ | 15.00 | 1.51680 | 64.20 |
| 4 | ∞ | 2.50 | | |
| 5 | −75.040 | 2.20 | 1.72916 | 54.68 |
| 6 | −19.169 | | | |

TABLE 7

EXAMPLE 2-3 DISPLAY OPTICAL SYSTEM

| Si | Ri | Di | Ndj | vdj |
|---|---|---|---|---|
| 1 | ∞ | 0.80 | 1.83400 | 37.16 |
| 2 | 21.694 | 4.00 | | |
| 3 | −93.037 | 0.80 | 1.92286 | 20.88 |
| 4 | 14.909 | 6.20 | 1.78800 | 47.37 |
| 5 | −14.909 | 0.30 | | |
| 6 | ∞ | 16.00 | 1.51680 | 64.20 |
| 7 | ∞ | 2.50 | | |
| 8 | −75.040 | 2.20 | 1.72916 | 54.68 |
| 9 | −19.169 | | | |

Example 2-4

Figure 12:
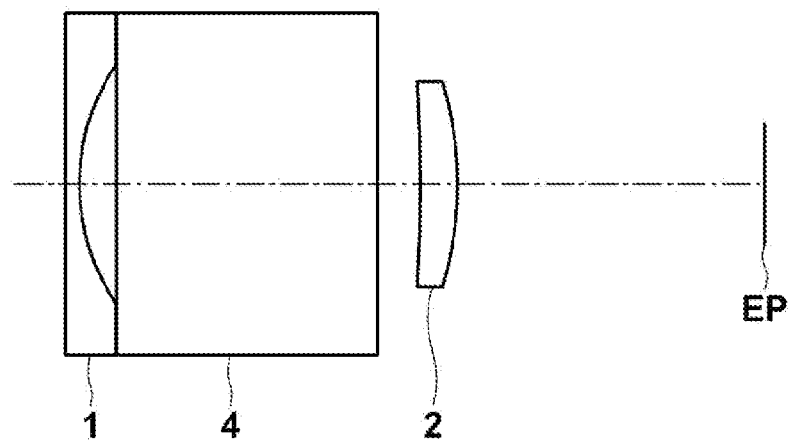
FIG. 12 is a cross section illustrating the structure of an observation optical system in a finder apparatus in Example 2-4 of the present invention.
Figure 13:
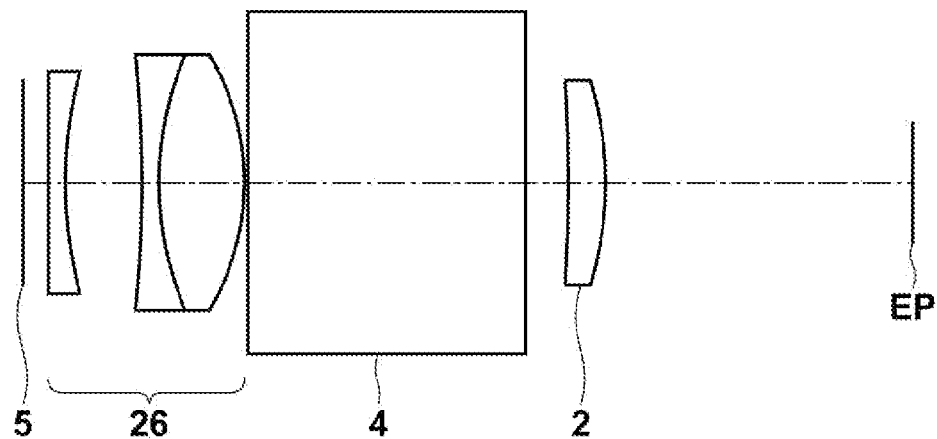
FIG. 13 is a cross section illustrating the structure of a display optical system in a finder apparatus in Example 2-4 of the present invention.

FIGS. 12 and 13 are cross sections of an observation optical system and a display optical system of a finder apparatus in Example 2-4, respectively. The optical path is developed in FIG. 13. A target lens group 26 in Example 2-4 has 2-group 3-element structure, and is composed of a negative lens and a cemented lens. The negative lens is arranged in such a manner that a distance between the display member 5 and the negative lens is 1.46 mm.

Tables 8 and 9 show lens data about the observation optical system in Example 2-4 and lens data about the display optical system in Example 2-4, respectively. FIGS. 26A through 26D are diagrams illustrating various aberrations of the observation optical system in Example 2-4. FIGS. 27A through 27D are diagrams illustrating various aberrations of the display optical system in Example 2-4.

TABLE 8

EXAMPLE 2-4 OBSERVATION OPTICAL SYSTEM

| Si | Ri | Di | Ndj | vdj |
|---|---|---|---|---|
| 1 | ∞ | 0.80 | 1.72916 | 54.68 |
| 2 | 12.429 | 2.20 | | |
| 3 | ∞ | 15.30 | 1.51680 | 64.20 |
| 4 | ∞ | 2.50 | | |
| 5 | −99.930 | 2.20 | 1.72916 | 54.68 |
| 6 | −20.346 | | | |

TABLE 9

EXAMPLE 2-4 DISPLAY OPTICAL SYSTEM

| Si | Ri | Di | Ndj | vdj |
|---|---|---|---|---|
| 1 | ∞ | 1.00 | 1.51680 | 64.20 |
| 2 | 25.000 | 4.50 | | |
| 3 | −75.000 | 1.00 | 1.92286 | 20.88 |
| 4 | 19.000 | 5.00 | 1.80400 | 46.57 |
| 5 | −14.800 | 0.20 | | |
| 6 | ∞ | 16.30 | 1.51680 | 64.20 |
| 7 | ∞ | 2.50 | | |
| 8 | −99.930 | 2.20 | 1.72916 | 54.68 |
| 9 | −20.346 | | | |

Example 2-5

Figure 14:
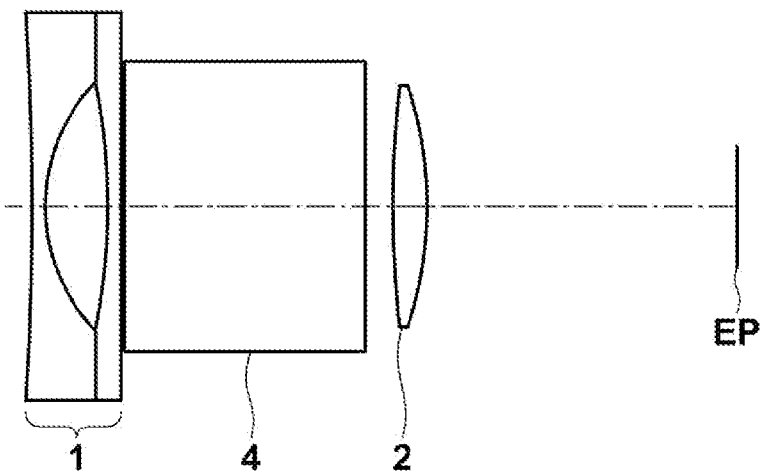
FIG. 14 is a cross section illustrating the structure of an observation optical system in a finder apparatus in Example 2-5 of the present invention.
Figure 15:
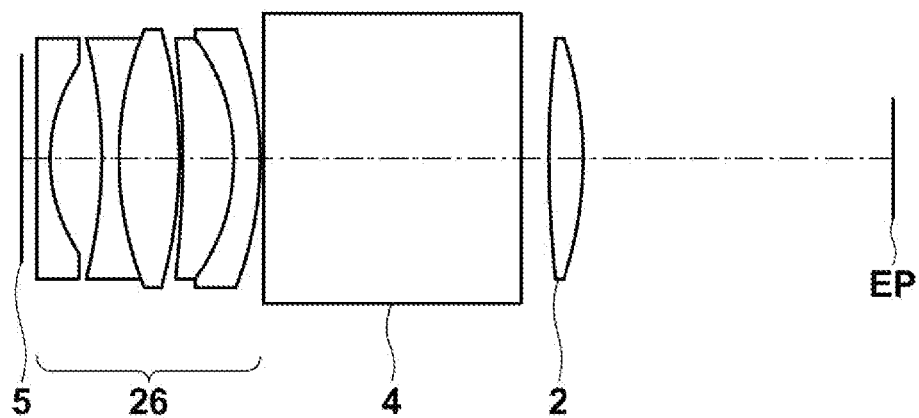
FIG. 15 is a cross section illustrating the structure of a display optical system in a finder apparatus in Example 2-5 of the present invention.
Figures 31A, 31B, 31C, 31D:
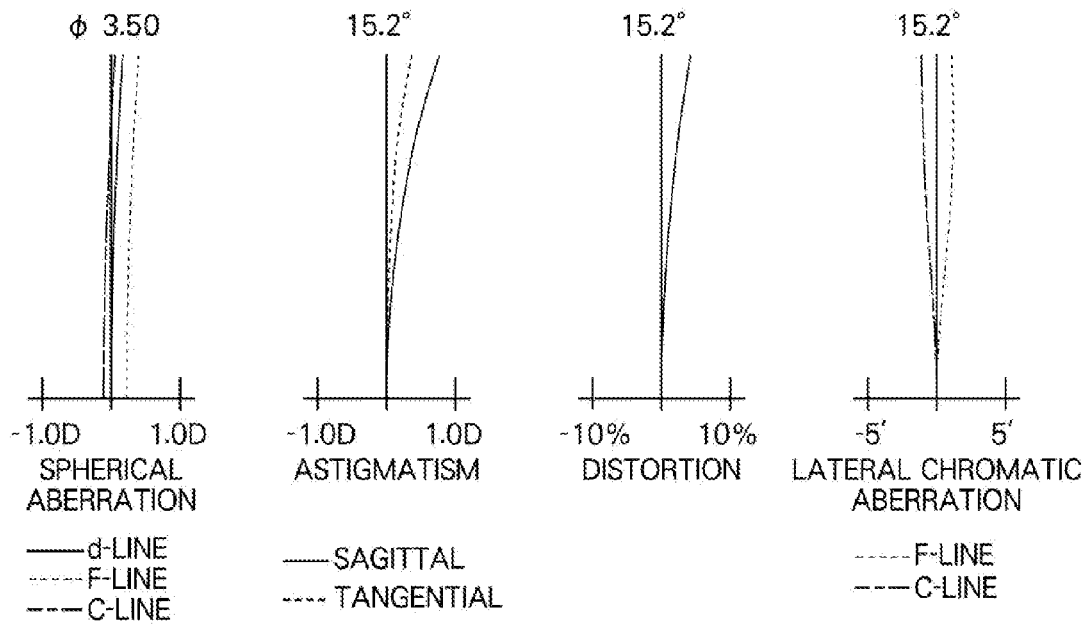
FIGS. 31A, 31B, 31C, and 31D are diagrams illustrating aberrations (spherical aberrations, astigmatism, distortion, and lateral chromatic aberration, respectively) of the display optical system in the finder apparatus in Example 3-1 of the present invention.
Figures 32A, 32B, 32C, 32D:
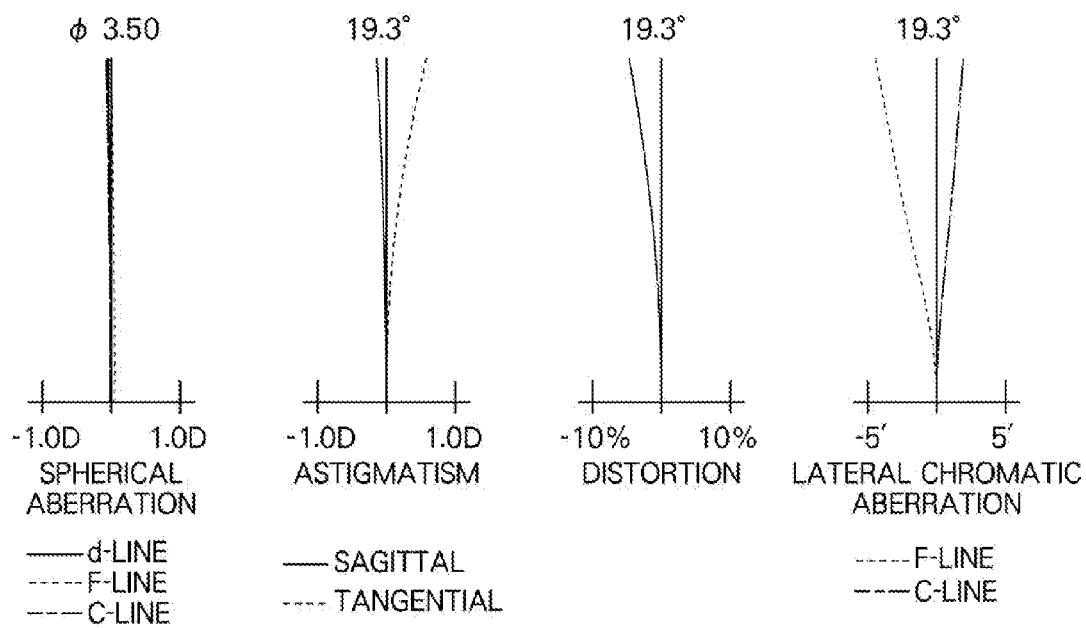
FIGS. 32A, 32B, 32C, and 32D are diagrams illustrating aberrations (spherical aberrations, astigmatism, distortion, and lateral chromatic aberration, respectively) of an observation optical system in a finder apparatus in Comparative Example 1.
Figures 35A, 35B, 35C, 35D:
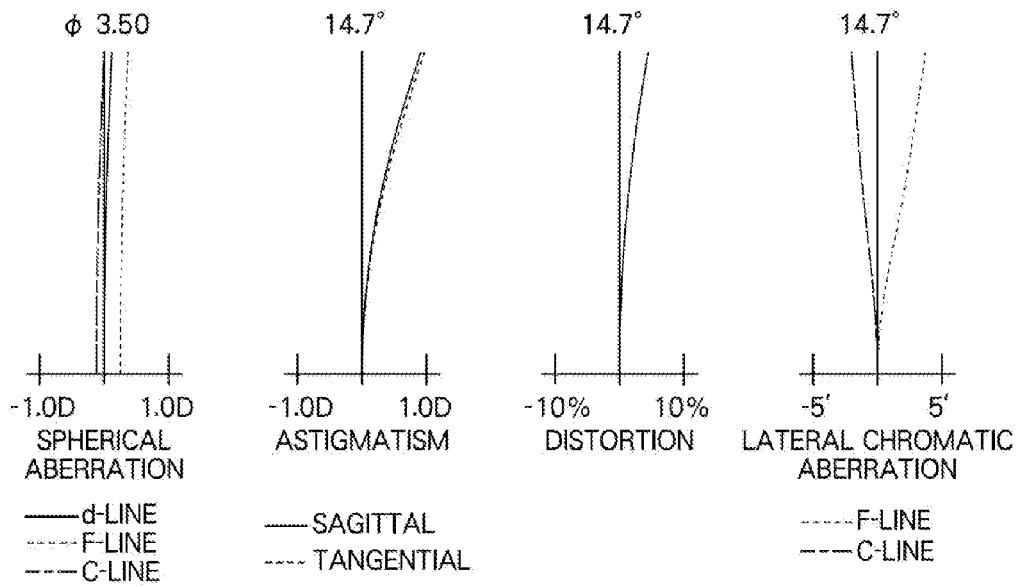
FIGS. 35A, 35B, 35C, and 35D are diagrams illustrating aberrations (spherical aberrations, astigmatism, distortion, and lateral chromatic aberration, respectively) of a display optical system in the finder apparatus in Comparative Example 2.

FIGS. 14 and 15 are cross sections of an observation optical system and a display optical system of a finder apparatus in Example 2-5, respectively. The optical path is developed in FIG. 15. A target lens group 26 in Example 2-5 has 3-group 5-element structure, and is composed of a negative lens and two cemented lenses. The negative lens is arranged in such a manner that a distance between the display member 5 and the negative lens is 0.80 mm.

Tables 10 and 11 show lens data about the observation optical system in Example 2-5 and lens data about the display optical system in Example 2-5, respectively. FIGS. 28A through 28D are diagrams illustrating various aberrations of the observation optical system in Example 2-5. FIGS. 29A through 29D are diagrams illustrating various aberrations of the display optical system in Example 2-5.

TABLE 10

EXAMPLE 2-5 OBSERVATION OPTICAL SYSTEM

| Si | Ri | Di | Ndj | vdj |
|---|---|---|---|---|
| 1 | −174.620 | 0.80 | 1.71300 | 53.90 |
| 2 | 10.458 | 3.60 | | |
| 3 | −36.777 | 0.80 | 1.71300 | 53.90 |
| 4 | ∞ | 0.20 | | |
| 5 | ∞ | 14.00 | 1.51680 | 64.20 |
| 6 | ∞ | 1.60 | | |
| 7 | 61.885 | 2.00 | 1.62041 | 60.30 |
| 8 | −22.518 | | | |

TABLE 11

EXAMPLE 2-5 DISPLAY OPTICAL SYSTEM

| Si | Ri | Di | Ndj | vdj |
|---|---|---|---|---|
| 1 | ∞ | 0.80 | 1.88300 | 40.76 |
| 2 | 10.000 | 3.00 | | |
| 3 | −28.000 | 1.00 | 1.84666 | 23.78 |
| 4 | 20.000 | 3.50 | 1.69680 | 55.60 |
| 5 | −28.000 | 0.20 | | |
| 6 | −60.000 | 3.00 | 1.69680 | 55.60 |
| 7 | −12.000 | 1.50 | 1.84666 | 23.78 |
| 8 | −21.000 | 0.20 | | |
| 9 | ∞ | 15.00 | 1.51680 | 64.20 |
| 10 | ∞ | 1.60 | | |
| 11 | 61.885 | 2.00 | 1.62041 | 60.30 |
| 12 | −22.518 | | | |

Example 3-1

FIGS. 16, 17, and 18 are diagrams illustrating the whole structure of a finder apparatus in Example 3-1, a cross section of an observation optical system in Example 3-1, and a cross section of a display optical system in Example 3-1, respectively. The finder apparatus in Example 3-1 uses a half mirror 24 as an optical path combination member. Substantially, Example 3-1 may be regarded as an example in which the half prism 4 in the finder apparatus of Example 2-1 is replaced by the half mirror 24. This structure in which the half prism 4 is replaced by the half mirror 24 may be applied also to examples other than Example 2-1.

The optical path is developed in FIG. 18. In FIGS. 17 and 18, the half mirror 24 is not illustrated. A target lens group 26 in Example 3-1 has 2-group 3-element structure, and is composed of a negative lens and a cemented lens. The negative lens is arranged in close contact with the display member 5.

Tables 12 and 13 show lens data about the observation optical system in Example 3-1 and lens data about the display optical system in Example 3-1, respectively. FIGS. 30A through 30D are diagrams illustrating various aberrations of the observation optical system in Example 3-1. FIGS. 31A through 31D are diagrams illustrating various aberrations of the display optical system in Example 3-1.

TABLE 12

EXAMPLE 3-1 OBSERVATION OPTICAL SYSTEM

| Si | Ri | Di | Ndj | vdj |
|---|---|---|---|---|
| 1 | ∞ | 0.80 | 1.62041 | 60.30 |
| 2 | 18.245 | 1.90 | | |
| 3 | ∞ | 0.80 | 1.51680 | 64.20 |
| 4 | 16.508 | 12.70 | | |
| 5 | 41.740 | 2.00 | 1.62041 | 60.30 |
| 6 | −33.568 | | | |

TABLE 13

EXAMPLE 3-1 DISPLAY OPTICAL SYSTEM

| Si | Ri | Di | Ndj | vdj |
|---|---|---|---|---|
| 1 | ∞ | 1.00 | 1.51680 | 64.20 |
| 2 | 50.000 | 7.20 | | |
| 3 | −51.959 | 4.50 | 1.80400 | 46.57 |
| 4 | −8.803 | 1.50 | 1.84666 | 23.78 |
| 5 | −21.008 | 11.70 | | |
| 6 | 41.740 | 2.00 | 1.62041 | 60.30 |
| 7 | −33.568 | | | |

Table 14 shows values corresponding to the formulas (1) and (2) with respect to the examples and comparative examples.

TABLE 14

| | f2 | fg |
|---|---|---|
| EXAMPLE 1-1 | 30.297 | 20.897 |
| EXAMPLE 1-2 | 30.297 | 21.265 |
| EXAMPLE 2-1 | 30.297 | 21.197 |
| EXAMPLE 2-2 | 30.297 | 21.170 |
| EXAMPLE 2-3 | 34.732 | 21.259 |
| EXAMPLE 2-4 | 34.634 | 20.092 |
| EXAMPLE 2-5 | 26.856 | 24.404 |
| EXAMPLE 3-1 | 30.297 | 21.199 |
| COMPARATIVE EXAMPLE 1 | 54.479 | 22.525 |
| COMPARATIVE EXAMPLE 2 | 54.003 | 22.122 |

Comparative Examples in Table 14 are Examples 1 and 2 described in Patent Document 2, respectively. Neither of the Comparative Examples satisfies both of the formulas (1) and (2). FIGS. 32A through 32D are diagrams illustrating various aberrations of an observation optical system in Comparative Example 1. FIGS. 33A through 33D are diagrams illustrating various aberrations of a display optical system in Comparative Example 1. FIGS. 34A through 34D are diagrams illustrating various aberrations of an observation optical system in Comparative Example 2. FIGS. 35A through 35D are diagrams illustrating various aberrations of a display optical system in Comparative Example 2.

When the diagrams illustrating aberrations of the display optical systems in the Examples and the diagrams illustrating aberrations of the display optical systems in the Comparative Examples are compared with each other, they differ from each other in the following points. With respect to astigmatisms, the Comparative Examples have large values in both of the sagittal direction and the tangential direction. However, in the Examples, the astigmatism is suppressed to a small value in one or both of the sagittal direction and the tangential direction. Further, lateral chromatic aberrations are corrected in the Examples in a more excellent manner than in the Comparative Examples.

Figure 36:
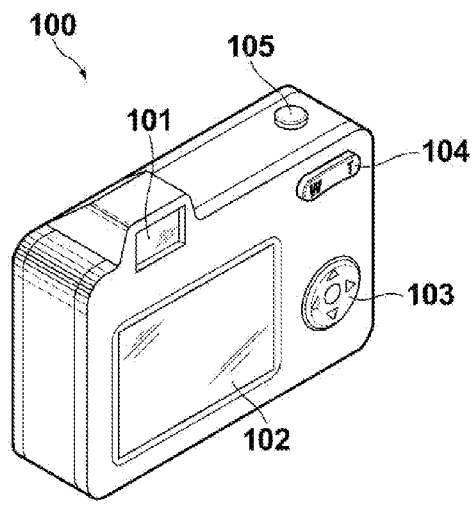
FIG. 36 is a schematic diagram illustrating the structure of an imaging apparatus according to an embodiment of the present invention.

Next, an imaging apparatus according to an embodiment of the present invention will be described. FIG. 36 is a perspective view of the back side of a digital camera 100, which is an imaging apparatus according to an embodiment of the present invention. The digital camera 100 includes a finder apparatus 101 according to an embodiment of the present invention, which is provided in the upper part of a camera body. The finder apparatus 101 is an electronic viewfinder. Further, the digital camera 100 includes a monitor 102, an operation button 103, and a zoom lever 104, which are provided on the back side of the camera body. The monitor 102 displays images and various setting screens. The operation button 103 is used to perform various kinds of setting, and the zoom lever 104 is used to change magnification. Further, a shutter button 105 is provided on the upper side of the camera body.

In the digital camera 100, a subject image obtained by an imaging lens (not illustrated), which is arranged on the front side of the camera body, is imaged by an imaging device (not illustrated). Further, the image obtained by imaging and display by a liquid crystal device (not illustrate) in the finder apparatus 101 are superimposed one on the other so that a user can observe the superimposed image through the finder apparatus 101. The digital camera 100 has a so-called superimpose function. The liquid crystal device in the finder apparatus 101 may display, for example, not only a field-of-view frame and a distance measurement area but also an image that has been already obtained by photography. Such an electronic viewfinder is advantageous in that an image that is being obtained by an imaging lens and an image that has already been obtained by photography are instantly switchable. A user who performs photography can check such images without moving his/her eye away from the finder apparatus 101, in other words, while continuously peeping through the finder apparatus 101.

So far, the present invention has been described by using embodiments and examples. However, the present invention is not limited to the aforementioned embodiments and examples, and various modifications are possible. For example, values, such as the radius of curvature of each lens element, a distance between surfaces, a refractive index, and an Abbe number, are not limited to the values shown in the numerical value examples, but may be other values.

What is claimed is:

1. A finder apparatus that superimposes, on an image formed by an observation optical system of a reverse-Galilean finder including an objective lens group having negative refractive power and an eyepiece lens group having positive refractive power, display on a display member arranged outside an optical path of the observation optical system by using an optical path combination member arranged between the objective lens group and the eyepiece lens group, thereby making a user observe the image on which the display is superimposed, the finder apparatus comprising:

a target lens group that guides light from the display member, and which is provided in an optical path from the display member to the eyepiece lens group, wherein the following formulas (1) and (2) are satisfied:

$$25.0 \text{ mm} < f2 < 40.0 \text{ mm} \quad (1); \text{ and}$$

$$15.0 \text{ mm} < fg < 27.0 \text{ mm} \quad (2), \text{ where}$$

f2 is the focal length of the eyepiece lens group, and fg is a combined focal length from the target lens group through the eyepiece lens group.

2. A finder apparatus, as defined in claim 1, wherein a most-display-member-side surface in the target lens group is concave.

3. A finder apparatus, as defined in claim 1, wherein the target lens group includes a cemented lens composed of a positive meniscus lens having a concave surface facing the display member side and a negative meniscus lens, which are cemented together in this order from the display member side.

4. A finder apparatus, as defined in claim 1, wherein the target lens group includes a negative lens having a concave surface facing the eyepiece lens group side, and which is arranged next to the display member or in the vicinity thereof.

5. A finder apparatus, as defined in claim 4, wherein the target lens group includes a lens having a concave surface facing the display member side, and which is arranged on the eyepiece lens group side of the negative lens with an air space between the lens and the negative lens.

6. A finder apparatus, as defined in claim 4, wherein the target lens group includes a cemented lens composed of a positive meniscus lens having a concave surface facing the display member side and a negative meniscus lens, which are cemented together in this order from the display member side.

7. A finder apparatus, as defined in claim 4, wherein the target lens group includes a cemented lens composed of a negative lens having a concave surface facing the display member side and a positive lens, which are cemented together in this order from the display member side.

8. An imaging apparatus, comprising:
a finder apparatus, as defined in claim 1.

* * * * *